United States Patent
Liu et al.

(10) Patent No.: US 12,439,380 B2
(45) Date of Patent: Oct. 7, 2025

(54) ADAPTING PERIODIC CONFIGURATIONS BASED ON SPATIAL RELATIONS

(71) Applicant: Telefonaktiebolaget LM Ericsson (publ), Stockholm (SE)

(72) Inventors: Yuhang Liu, Lund (SE); Peter Alriksson, Hörby (SE); Min Wang, Luleå (SE); Stephen Grant, Pleasanton, CA (US); Jung-Fu Cheng, Fremont, CA (US); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 17/924,786

(22) PCT Filed: May 17, 2021

(86) PCT No.: PCT/EP2021/062938
§ 371 (c)(1),
(2) Date: Nov. 11, 2022

(87) PCT Pub. No.: WO2021/229094
PCT Pub. Date: Nov. 18, 2021

(65) Prior Publication Data
US 2023/0209507 A1    Jun. 29, 2023

Related U.S. Application Data
(60) Provisional application No. 63/025,462, filed on May 15, 2020.

(51) Int. Cl.
*H04W 72/02* (2009.01)
*H04W 72/1268* (2023.01)
*H04W 72/23* (2023.01)

(52) U.S. Cl.
CPC ....... *H04W 72/02* (2013.01); *H04W 72/1268* (2013.01); *H04W 72/23* (2023.01)

(58) Field of Classification Search
CPC . H04W 72/02; H04W 72/23; H04W 72/1268; H04W 28/06; H04W 72/0453;
(Continued)

(56) References Cited

U.S. PATENT DOCUMENTS

2018/0262307 A1* 9/2018 Shimezawa ........... H04L 5/0053
2019/0281588 A1   9/2019 Zhang et al.
(Continued)

FOREIGN PATENT DOCUMENTS

CN   110062397 A   7/2019
CN   110249573 A   9/2019
(Continued)

OTHER PUBLICATIONS

3GPP, "3GPP TS 38.321 V16.0.0", 3rd Generation Partnership Project; Technical Specification Group Radio Access Network; NR; Medium Access Control (MAC) protocol specification (Release 16), Mar. 2020, 1-141.
(Continued)

*Primary Examiner* — Mewale A Ambaye
(74) *Attorney, Agent, or Firm* — Murphy, Bilak & Homiller, PLLC

(57) ABSTRACT

A method, network node and wireless device (WD) for adapting periodic configurations based on spatial relations are disclosed. According to one aspect, a method includes configuring multiple transmission resources or multiple sets of transmission occasions for a radio resource control configured periodic uplink transmission. The method further includes associating each configured uplink transmission received from the WD by the network node with a downlink reference signal, the downlink reference signal provided as
(Continued)

a direct or indirect spatial relation reference for the uplink transmission.

12 Claims, 12 Drawing Sheets

(58) Field of Classification Search
CPC .................. H04W 74/0833; H04W 74/08; H04L 1/0079; H04L 1/0026; H04L 1/0072
See application file for complete search history.

(56) References Cited

U.S. PATENT DOCUMENTS

| | | | |
|---|---|---|---|
| 2021/0243784 A1* | 8/2021 | Goto | H04W 72/21 |
| 2023/0069425 A1* | 3/2023 | Zhao | H04W 72/20 |
| 2023/0096178 A1* | 3/2023 | Wu | H04W 72/51 |
| | | | 370/329 |
| 2023/0170968 A1* | 6/2023 | Wang | H04B 7/0695 |
| | | | 375/262 |
| 2023/0224952 A1* | 7/2023 | Zheng | H04W 56/0045 |
| | | | 370/329 |
| 2023/0247438 A1* | 8/2023 | Yang | H04W 76/20 |
| | | | 370/329 |

FOREIGN PATENT DOCUMENTS

| | | |
|---|---|---|
| CN | 110380834 A | 10/2019 |
| CN | 110651445 A | 1/2020 |
| EP | 2015594 A1 | 1/2009 |
| EP | 3033850 A1 * | 6/2016 ........... H04L 5/0037 |
| EP | 3331295 A1 | 6/2018 |
| WO | 2015022092 A1 | 2/2015 |
| WO | 2018202867 A1 | 11/2018 |
| WO | 2019138380 A1 | 7/2019 |
| WO | 2019208774 A1 | 10/2019 |

OTHER PUBLICATIONS

"New SID: Study on supporting NR from 52.6GHz to 71 Ghz", 3GPP TSG RAN Meeting #86, RP-193259, Sitges, Spain, (revision of RP-193258), Dec. 9-12, 2019, 1-3.

3GPP, "3GPP TS 38.213 V16.1.0", 3rd Generation Partnership Project; Technical Specification Group Radio Access Network; NR; Physical layer procedures for control (Release 16), Mar. 2020, 1-156.

"Discussion on active spatial relation switch", 3GPP TSG-RAN WG4 Meeting #94-e; R4-2001036; Electronic Meeting; Agenda Item: 8.15.1.8; Source: MediaTek Inc., Feb. 24-Mar. 6, 2020, 1-6.

"Discussion on spatial relation switch for uplink", 3GPP TSG-RAN WG4 Meeting #94-e; R4-2001667; Online; Source: Huawei, HiSilicon; Agenda item: 8.15.1.8, Feb. 24-Mar. 6, 2020, 1-5.

"Remaining issues on beam management enhancements in Rel. 16", 3GPP TSG RAN WG1 #98bis; R1-1910350; Chongqing, China; Source: CATT; Agenda Item: 7.2.8.3, Oct. 13-20, 2019, 1-9.

"Spatial Relations and MAC CE", 3GPP TSG-RAN WG2 #109-e; R2-2001237; Electronic meeting; Agenda Item: 6.8.2; Source: Ericsson, Feb. 24-Mar. 6, 2020, 1-5.

* cited by examiner

| R | SERVING CELL ID | | BWP ID | OCT 1 |
|---|---|---|---|---|
| R | PUCCH RESOURCE ID | | | OCT 2 |
| R | R | SPATIAL RELATION INFO ID | | OCT 3 |

...

| R | PUCCH RESOURCE ID | | OCT 2N-2 |
|---|---|---|---|
| R | R | SPATIAL RELATION INFO ID | OCT 2N-1 |

FIG. 2

ADAPTING PERIODIC CONFIGURATIONS BASED ON SPATIAL RELATIONS

TECHNICAL FIELD

The present disclosure relates to wireless communications, and in particular, to adapting periodic configurations based on spatial relations.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD).

Mobile broadband systems continue to provide for higher and higher overall traffic capacity and higher achievable end-user data rates in the wireless access network. Several scenarios in the future will require data rates of up to 10 Gigabits per second (Gbps) in local areas. These demands for very high system capacity and very high end-user data rates can be met by networks with distances between access nodes ranging from a few meters in indoor deployments up to roughly 50 m in outdoor deployments, i.e., with an infra-structure density considerably higher than the densest networks of today. The wide transmission bandwidths needed to provide data rates up to 10 Gbps and above can likely only be obtained from spectrum allocations in the millimeter-wave band. High-gain beamforming, typically realized with array antennas, can be used to mitigate the increased pathloss at higher frequencies. Such networks are referred to as NR systems in the following.

NR supports a diverse set of use cases and a diverse set of deployment scenarios. The latter includes deployment at low frequencies (100s of MHz), and very high frequencies (mm waves in the tens of GHz). Two operational frequency ranges are defined in the NR Technical Release-15 (Rel-15): FR1 from 410 MHz to 7125 MHz and FR2 from 24.250 GHz to 52.6 GHz. 3GPP RAN is currently working on a study item for NR 3GPP Rel-17 to support NR operation from 52.6 GHz to 71 GHz, which includes the following considerations:

Study of required changes to NR using existing downlink/uplink (DL/UL) NR waveforms to support operation between 52.6 GHz and 71 GHz;
  a) Study of applicable numerology including subcarrier spacing, channel bandwidth (BW) (including maximum BW), and their impact in FR2 physical layer design to support system functionality considering practical radio frequency (RF) impairments [Radio Access Network 1 (RAN1) and radio access network 4 (RAN4)]; and
  b) Identify potential critical problems to physical signals/channels, if any [RAM].

Study of the channel access mechanism, considering potential interference to and from other nodes, assuming beam-based operation, in order to comply with the regulatory requirements applicable to unlicensed spectrum for frequencies between 52.6 GHz and 71 GHz [RAN1].

Note: A potential interference impact, if identified, may require interference mitigation solutions as part of a channel access mechanism.

NR Frame Structure

Similar to LTE, NR uses OFDM (Orthogonal Frequency Division Multiplexing) in the downlink (i.e., from a network node, gNB, eNB, or base station, to a wireless device or WD). The basic NR physical resource over an antenna port can thus be seen as a time-frequency grid, as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^\mu)$ kHz where $\mu \in (0, 1, 2, 3, 4)$. $\Delta f=15$ kHz is the basic (or reference) subcarrier spacing that is also used in LTE.

In the time domain, downlink and uplink transmissions in NR will be organized into equally-sized subframes of 1 ms each, similar to LTE. A subframe is further divided into multiple slots of equal duration. The slot length for subcarrier spacing $\Delta f=(15\times 2^\mu)$ kHz is $\frac{1}{2}^\mu$μms. There is only one slot per subframe for $\Delta f=15$ kHz and a slot consists of 14 OFDM symbols.

Downlink transmissions are dynamically scheduled, i.e., the network node transmits downlink control information (DCI) in each slot as to which WD data is to be transmitted, and on which resource blocks in the current downlink slot the data is transmitted. This control information is typically transmitted in the first one or two OFDM symbols in each slot in NR. The control information is carried on the Physical Downlink Control Channel (PDCCH) and data is carried on the Physical Downlink Shared Channel (PDSCH). A WD first detects and decodes the PDCCH and if a PDCCH is decoded successfully, it then decodes the corresponding PDSCH based on the downlink assignment provided by decoded control information in the PDCCH.

In addition to the PDCCH and PDSCH, there are also other channels and reference signals transmitted in the downlink, including a synchronization signal block (SSB), channel state information reference signal (CSI-RS), etc.

Uplink data transmissions, carried on the Physical Uplink Shared Channel (PUSCH), can also be dynamically scheduled by the network node by transmitting a DCI. The DCI (which is transmitted in the DL region) always indicates a scheduling time offset so that the PUSCH is transmitted in a slot in the UL region.

Periodic and Semi-Persistent Configurations

In NR, the network node can configure the WD with a number of periodic configurations. A periodic configuration can cover either an UL transmission occasion or a DL reception occasion. Periodic UL transmissions may be configured for one of the following non-limiting purposes:
 1) scheduling request (SR);
 2) periodic CSI reporting;
 3) sounding reference signal (SRS);
 4) configured grant transmission (CG Type1 and CG Type2);
 5) Random access channel (RACH).

An example of a periodic downlink configuration is the periodic CSI-RS and discontinuous reception (DRX) configuration, which determines during which time occasions the WD should monitor the PDCCH.

For these periodic configurations, there is an agreement between the network node and WD on when a transmission is expected. The offset (to some common time reference, e.g., system frame number 0) is either radio resource control (RRC) configured in relation to downlink control information (DCI) activating the semi-persistent configuration. The periodicity is always RRC configured.

Scheduling Request

In NR, a Scheduling Request (SR) is used for requesting uplink shared channel (UL-SCH) resources for a new transmission. A WD in connected mode may be configured with zero, one, or more SR configurations, with each SR configuration corresponding to one or multiple logical channels. An SR configuration includes a set of physical uplink control channel (PUCCH) resources for SR across different bandwidth parts (BWPs) and cells, also referred as SR resources in the 3GPP standard. There is at most, one SR resource assigned to a SR configuration in a BWP in a serving cell. An SR resource configuration includes an SR periodicity and time offset parameter (periodicityAndOffset) and a PUCCH resource ID. The SR periodicity and time offset parameter specifies the SR transmission occasions in the time domain, and the PUCCH resource ID indicates which one of the PUCCH resources in the PUCCH configuration should be used for SR transmission. FIG. 2 illustrates an example of a known SR resource configuration.

Periodic or Semi-Persistent CSI Reporting on PUCCH

The WD can be configured with up to 48 channel state information (CSI) report configurations. The CSI report configuration contains a CSI-ReportPeriodicityAndOffset field and a PUCCH resource ID. With the CSI-ReportPeriodicityAndOffset field, the WD is allowed to be jointly configured with the periodicity and corresponding slot offset for a specific PUCCH resource.

Beam-Forming Centric Transmission for NR Operation in Mm-Wave Frequency

As the operating frequency of wireless networks increases and moves to millimeter wavelengths, data transmission between nodes suffers from high propagation loss, which is proportional to the square of the carrier frequency. Moreover, millimeter wave signals also suffer from high oxygen absorption, high penetration loss and a variety of blockage problems. On the other hand, with the wavelength as small as less than a centimeter, it becomes possible to pack a large amount (tens, hundreds or even thousands) of antenna elements into a single antenna array with a compact form factor, which can be widely adopted in network equipment and a user device (WD). Such antenna arrays can generate narrow beams with high beam forming gain to compensate for the high path loss in mm-wave communications, as well as providing highly directional transmission and reception pattern. As a consequence, directional transmission and reception are the distinguishing characteristics for wireless networks in mm-wave bands. In the case of analog beamforming where the amplitude/phase of each antenna element is adjusted at radio frequencies (RF), a transceiver can typically only transmit or receive in one direction at a time, or if the WD is equipped with two or more antenna arrays, a few directions at any given time. This is in contrast to digital or hybrid analog-digital beamforming, where the phase weights are applied at baseband allowing different beam directions in different frequency sub-bands.

Spatial Relations for PUCCH

NR 3GPP Rel-15 introduced the concept of spatial relations for a number of signals and channels. For PUCCH, specifically, the spatial relation is configured by the parameter PUCCH-SpatialRelationInfo. This is used to inform the WD as to how to tune its transmitter antenna array for transmitting PUCCH. For each PUCCH resource, the parameter PUCCH-SpatialRelationInfo provides the spatial relation to another signal. Loosely speaking, this tells the WD it should beamform PUCCH in the same way as it received or transmitted the other signal. The other signal can either be a synchronization signal/physical broadcast channel (SS/PBCH) block, a CSI-RS or an SRS as defined in 3GPP TR 38.213:

If PUCCH-SpatialRelationInfo provides ssb-Index, the WD transmits the PUCCH using a same spatial domain filter as for a reception of an SS/PBCH block with index provided by ssb-Index for a same serving cell or, if servingCellId is provided, for a serving cell indicated by servingCellId;

else; if PUCCH-SpatialRelationInfo provides csi-RS-Index, the WD transmits the PUCCH using a same spatial domain filter as for a reception of a CSI-RS with resource index provided by csi-RS-Index for a same serving cell or, if servingCellId is provided, for a serving cell indicated by servingCellId;

else; PUCCH-SpatialRelationInfo provides srs, the WD transmits the PUCCH using a same spatial domain filter as for a transmission of a SRS with resource index provided by resource for a same serving cell and/or active UL BWP or, if servingCellId and/or uplinkBWP are provided, for a serving cell indicated by servingCellId and/or for an UL BWP indicated by uplinkBWP.

After configuring the WD with a list of spatial relations, the network node activates one of them using a medium access control (MAC) control element (MAC CE). The update will typically come as a response to the WD that has reported a stronger received power for another reference signal (SSB, CSI-RS) or that the network node has indicated is a preferred reference signal (SRS) than the one the current spatial relation is associated with. Thus, as the WD moves around in the cell, the WD provides CSI reports to the network node, based on which the network node will update the currently active spatial relation.

An Enhanced PUCCH Spatial Relation Activation/Deactivation MAC CE was introduced in 3GPP Rel-16. This allows the network node to update spatial relations for multiple PUCCH resources. Correspondingly, the space of Spatial Relation Info ID is extended from 8 to 64.

Spatial Relations for PUSCH Using Configured Grants

Two types of Configured Grant (CG) UL transmission schemes have been supported in NR since 3GPP Rel-15, referred as CG Type1 and CG Type2 in the NR standards. The major difference between these two types of CG transmissions is that for CG Type1, an uplink grant is provided by RRC configuration and activated automatically, while in the case of CG Type2, the uplink grant is provided and activated via L1 signaling, i.e., by an UL DCI with cyclic redundancy check (CRC) scrambled by cell specific radio network temporary identifier (CS-RNTI). In both cases, the spatial relation used for a PUSCH transmission with Configured Grant is indicated by the uplink grant, either provided by the RRC configuration or by an UL DCI. The uplink grant contains an srs-ResourceIndicator field, pointing to one of the SRS resources in the SRS resource configuration, which can be configured in-turn with a spatial relation to a DL reference signal (SSB or CSI-RS) or another SRS resource.

With the SRS resource indicator in the uplink grant and the RRC SRS resource configuration, the PUSCH with Configured Grant is supposed to be transmitted with the same precoder or beamforming weights as the one used for the transmission of the reference SRS.

Beamforming is expected to be widely applied for NR operation in mm-wave bands for both transmission and reception. For UL transmission, a spatial relation needs to be established and understood by both WD and network node before transmission in the UL is conducted. A spatial relation is defined between an UL channel/reference signal (PUSCH, PUCCH, SRS) and either a DL reference signal (CSI-RS, SS/PBCH block) or another UL reference signal (SRS). If UL channel/signal A is spatially related to reference signal B, it means the WD should beamform A in the same way as it received or transmitted B.

By establishing a spatial relation, the WD learns in which direction to beamform its transmission signal towards the targeted network node, and the network node also learns how to tune its receive (RX) beam towards the WD. A number of issues are identified below regarding UL beamforming in the scenario of periodic UL transmission, such as Scheduling Request, UL CG (Type 1 or Type 2), SRS transmission and periodic CSI reporting.

First, in the periodic transmission scenario where transmission is initiated by a WD, the network node (e.g., gNB) might not know from which direction the WD will transmit. Hence, the network node might not be able to tune its RX beam properly towards the WD. When this beam misalignment happens, the probability of the UL transmission not being heard by the network node can be very high. As a consequence, the UL transmission suffers from low reliability or high transmission latency (due to excessive re-transmissions).

Second, the network node with analog beamforming capability can only listen to UL transmissions in one direction (per antenna panel) at a time. To solve this, the network node can periodically sweep through all beams in the cell for periodic UL transmissions in relevant transmission occasions. In such a scenario, the UL transmission latency is not only caused by the periodicity configured to the WDs, but also by the periodicity of beam sweeping in the network node. For example, in a cell where a large number of narrow beams are configured, it may take many slots for the network node to beam-sweep through the entire cell for SR detection. Statistically, the SR latency can become excessively high. This can be problematic for some devices or applications with tight latency requirements. Moreover, even with this approach, it is not guaranteed that the network node will hear the WD-initiated transmission, since the WD may be unaware of the beam sweeping pattern of the network node.

Third, periodic UL transmission resources for multiple WDs can be configured in the same OFDM symbol(s) by means of frequency or code multiplexing to improve resource efficiency. The network node with an analog beamforming capability should multiplex periodic UL transmission resources in the same time occasion only for WDs located in the same beam coverage area, so that the network node can receive the periodic UL transmissions from the WDs with the same RX beam. When the WDs are moving around in the cell across different beam coverage areas, the network node needs to frequently re-configure periodic UL transmission resources for the WDs by dedicated RRC signaling to ensure that only WDs in the coverage area of a particular RX beam are multiplexed in the same time occasion. This may lead to excessive signaling overhead. For some types of periodic UL transmissions, the NR standards allow the network node to update the transmission direction information (spatial relation) more frequently than RRC re-configurations using MAC CE or DCI. However, some other periodic configuration parameters, such as the time offset which determines which time occasion the WD should use for UL transmission, and the frequency and code allocation which specify resource multiplexing across multiple WDs, are typically RRC configured and thus cannot be changed very frequently.

Reconfiguration of periodic uplink transmission resources can be considered as an integral part of an intra-cell handover procedure where a WD in connected mode is instructed explicitly or implicitly to handover from one beam coverage area to another within the same cell. In the current arrangements, this procedure involves excessive RRC level signaling.

SUMMARY

There is a need for a way to allow frequent low overhead updates of which frequency allocation, code allocation, time occasions and spatial relation the WD should use for reception and/or transmission based on the transmission or reception direction (spatial) information. Some embodiments advantageously provide methods, network nodes, and wireless devices for adapting periodic configurations based on spatial relations.

Enhancements to periodic or semi-persistent uplink transmission arrangements are disclosed. The arrangements allow efficient updates of which periodic transmission resources and opportunities the WD should use based on which spatial relation is configured for UL transmission. The arrangements may ensure that the WD transmits on a certain beam only during the time occasions in which the network node is listening in the reciprocal direction as the WD transmission.

The solution described in this disclosure can avoid network node missed detection of configured uplink transmissions due to beam mismatch. In addition, it avoids frequent RRC reconfigurations of periodic uplink transmission resources (e.g., SR, CG Type1 and CSI). The described solution also provides flexible resource scheduling and more efficient spatial sweeping for configured uplink transmission as compared with known arrangements.

According to one aspect, a network node configured to communicate with a wireless device (WD), includes a radio interface and/or comprising processing circuitry configured to configure multiple transmission resources or multiple sets of transmission occasions for a radio resource control configured periodic uplink transmission, The network node is further configured to associate each configured uplink transmission received from the WD by the network node with a downlink reference signal, the downlink reference signal provided as a direct or indirect spatial relation reference for the uplink transmission.

According to this aspect, in some embodiments, the processing circuitry and/or radio interface further signals the association to the WD. In some embodiments, the processing circuitry is further configured to configure time domain parameters for the periodic uplink transmission so as to cause all configured uplink transmission to occur within a certain time window. In some embodiments, the processing circuitry is further configured to select one or more of the periodic uplink transmission resources or one or more sets of transmission occasions. In some embodiments, the processing circuitry is further configured to periodically update the spatial relation references.

According to another aspect, a method implemented in a network node, includes configuring multiple transmission resources or multiple sets of transmission occasions for a radio resource control configured periodic uplink transmission, and associating each configured uplink transmission received from the WD by the network node with a downlink reference signal, the downlink reference signal provided as a direct or indirect spatial relation reference for the uplink transmission.

According to this aspect, in some embodiments, the method further includes signaling the association to the WD. In some embodiments, the method further includes configuring time domain parameters for the periodic uplink transmission so as to cause all configured uplink transmission to occur within a certain time window. In some embodiments, the method further includes selecting one or more of the periodic uplink transmission resources or one or more sets of transmission occasions. In some embodiments, the method further includes periodically updating the spatial relation references.

According to yet another aspect, a wireless device (WD) is configured to communicate with a network node. The WD includes a radio interface and/or processing circuitry configured to: measure downlink signal quality; and based on the measurement, select one or more configured resources, or periodicity and offset, or occasion bitmap that is associated with a downlink reference signal.

According to this aspect, the selecting includes choosing a configured resources, or periodicity and offset, or occasion bitmap that results in measured signal quality that exceeds a threshold.

According to another aspect, a method implemented in a wireless device (WD), includes measuring downlink signal quality; and based on the measurement, selecting one or more configured resources, or periodicity and offset, or occasion bitmap that is associated with a downlink reference signal.

According to this aspect, the selecting includes choosing a configured resources, or periodicity and offset, or occasion bitmap that results in measured signal quality that exceeds a threshold.

According to another aspect, a network node configured to communicate with a WD is provided. The network node includes processing circuitry configured to configure multiple transmission resources or multiple sets of transmission occasions for use by the WD on radio resource control, RRC, configured periodic uplink transmissions. The processing circuitry is further configured to determine which configured multiple transmission resources or multiple sets of transmission occasions are used by the WD. The network node also includes a radio interface configured to receive transmissions from the WD in at least one of the determined multiple transmission resources or multiple sets of transmission occasions.

According to this aspect, the processing circuitry is further configured to activate or deactivate one or more of the RRC configured multiple transmission resources or multiple sets of transmission occasions by using explicit signaling. In some embodiments, the explicit signaling is a medium access control, MAC, control element, CE, or downlink control information, DCI. In some embodiments, transmissions received from the WD are associated with a downlink reference signal, the downlink reference signal being a direct or indirect spatial relation reference for the received RRC configured periodic uplink transmissions. In some embodiments, the radio interface is further configured to receive the RRC configured periodic uplink transmissions from multiple WDs using a same beam forming filter. In some embodiments, the processing circuitry is further configured to configure time domain parameters for the RRC configured periodic uplink transmissions by the radio interface so as to cause all RRC configured periodic uplink transmissions of a set of WDs within a coverage area of a same beam to occur within a same time window. In some embodiments, a spatial relation reference for the RRC configured periodic uplink transmissions is an uplink or downlink reference signal associated with each configured uplink transmission resource of the multiple transmission resources or each set of the multiple sets of transmission occasions. In some embodiments, the processing circuitry is further configured to configure the WD with multiple periodic uplink transmission resources for uplink transmission in a bandwidth part in a serving cell. In some embodiments, the processing circuitry is further configured to associate a scheduling request configuration with one or more scheduling request resources in a bandwidth part in a serving cell. In some embodiments, the processing circuitry is further configured to configure multiple PUCCH resources for a channel state information, CSI, reporting configuration in a bandwidth part in a serving cell.

According to yet another aspect, a method in a network node configured to communicate with a WD is provided. The method includes configuring multiple transmission resources or multiple sets of transmission occasions for use by the WD on radio resource control, RRC, configured periodic uplink transmissions. The method also includes determining which configured transmission resources or multiple sets of transmission occasions are used by the WD. The method further includes receiving transmissions from the WD in at least one of the determined multiple transmission resources or multiple sets of transmission occasions.

According to this aspect, in some embodiments, the method further includes activating or deactivating one or more of the RRC configured multiple transmission resources or multiple sets of transmission occasions by using explicit signaling. In some embodiments, the explicit signaling is a medium access control, MAC, control element, CE, or downlink control information, DCI. In some embodiments, the transmissions received from the WD are associated with a downlink reference signal, the downlink reference signal being a direct or indirect spatial relation reference for the received RRC configured periodic uplink transmissions. In some embodiments, the method includes receiving the RRC configured periodic uplink transmissions from multiple WDs using a same beam forming filter. In some embodiments, the method also includes configuring time domain parameters for the RRC configured periodic uplink transmissions so as to cause all RRC configured periodic uplink transmissions of a set of WDs within a coverage area of a same beam to occur within a same time window. In some embodiments, a spatial relation reference for the RRC configured periodic uplink transmissions is an uplink or downlink reference signal associated with each configured uplink transmission resource of the multiple transmission resources or each set of the multiple sets of transmission occasions. In some embodiments, the method further includes configuring the WD with multiple periodic uplink transmission resources for uplink transmission in a bandwidth part in a serving cell. In some embodiments, the method also includes associating a scheduling request configuration with one or more scheduling request resources in a bandwidth part in a serving cell. In some embodiments, the method also includes configuring multiple PUCCH resources for a channel state information, CSI, reporting configuration in a bandwidth part in a serving cell.

According to another aspect, a WD configured to communicate with a network node is provided. The wireless device includes a radio interface configured to receive a configuration of a plurality of periodic uplink transmission resources via at least one radio resource control RRC, message. The WD also includes processing circuitry configured to activate or deactivate a subset of the plurality of periodic uplink transmission resources. The radio interface is configured to transmit uplink transmissions on one or more activated periodic uplink transmission resources.

According to this aspect, in some embodiments, the subset of the plurality of periodic uplink transmission resources are selected to be activated or deactivated based on a signal received from the network node. In some embodiments, the signal includes a medium access control, MAC, control element, CE, a downlink control information, DCI message, or an RRC message. In some embodiments, the activated subset of the plurality of periodic uplink transmission resources are selected autonomously by the WD. In some embodiments, the radio interface is further configured to: receive a first message associating a spatial relation between each of the plurality of periodic uplink transmission resources and a downlink or uplink reference signal, and transmit a second message on one or more activated periodic UL transmission resources includes transmitting on UL transmission resources that are each associated with a valid spatial relation. In some embodiments, the downlink or uplink reference signal is a synchronization signal/physical broadcast channel, SS/PBCH, a channel state information reference signal, CSI-RS resource, or a sounding reference signal, SRS, resource. In some embodiments, deactivation based on a signal received from a network node includes receiving an indicator of an invalid spatial relation. In some embodiments, the processing circuitry is further configured to determine the subset of the plurality of periodic uplink transmission resources based on measurements of a plurality of downlink signals. In some embodiments, the processing circuitry is further configured to determine a signal quality measure of a downlink reference signal, the downlink reference signal being a direct or indirect spatial relation reference for a radio resource control, RRC, configured periodic uplink transmission. In some embodiments, the radio interface is further configured to receive an RRC message indicating zero, one or multiple periodic uplink transmission resources for a shared channel transmission or uplink control information, UCI, transmission in a bandwidth part in a serving cell that includes the WD. In some embodiments, the processing circuitry is further configured to activate or deactivate the subset of the plurality of periodic uplink transmission resources according to a bitmap, each bit of the bitmap indicating activation or deactivation of a different one of the periodic uplink transmission resources. In some embodiments, a periodic uplink transmission resource of the plurality of periodic uplink transmission resources is a scheduling request resource, a configured grant resource, or a physical uplink control channel resource for channel state information, CSI, reporting. In some embodiments, the subset of the plurality of periodic uplink transmission resources is determined based on measurements of a plurality of downlink signals.

According to yet another aspect, a method in a wireless device, WD, configured to communicate with a network node is provided. The method includes receiving a configuration of a plurality of periodic uplink transmission resources via at least one radio resource control RRC, message. The method also includes activating or deactivating a subset of the plurality of periodic uplink transmission resources. The method also includes transmitting uplink transmissions on one or more activated periodic uplink transmission resources. In some embodiments, the subset of the plurality of periodic uplink transmission resources are selected to be activated or deactivated based on a signal received from the network node. In some embodiments, the signal includes a medium access control, MAC, control element, CE, a downlink control information, DCI message, or an RRC message. In some embodiments, the activated subset of the plurality of periodic uplink transmission resources are selected autonomously by the WD. In some embodiments, the method further includes receiving a first message associating a spatial relation between each of the plurality of periodic uplink transmission resources and a downlink or uplink reference signal, and transmitting a second message on one or more activated periodic UL transmission resources includes transmitting on UL transmission resources that are each associated with a valid spatial relation. In some embodiments, the downlink or uplink reference signal is a synchronization signal/physical broadcast channel, SS/PBCH, a channel state information reference signal, CSI-RS resource, or a sounding reference signal, SRS, resource. In some embodiments, deactivation based on a signal received from a network node includes receiving an indicator of an invalid spatial relation. In some embodiments, the method also includes determining the subset of the plurality of periodic uplink transmission resources based on measurements of a plurality of downlink signals. In some embodiments, the method also includes determining a signal quality measure of a downlink reference signal, the downlink reference signal being a direct or indirect spatial relation reference for a radio resource control, RRC, configured periodic uplink transmission. In some embodiments, the method also includes receiving an RRC message indicating zero, one or multiple periodic uplink transmission resources for a shared channel transmission or uplink control information, UCI, transmission in a bandwidth part in a serving cell that includes the WD. In some embodiments, the method also includes activating or deactivating the subset of the plurality of periodic uplink transmission resources according to a bitmap, each bit of the bitmap indicating activation or deactivation of a different one of the periodic uplink transmission resources. In some embodiments, a periodic uplink transmission resource of the plurality of periodic uplink transmission resources is a scheduling request resource, a configured grant resource, or a physical uplink control channel resource for channel state information, CSI, reporting. In some embodiments, the subset of the plurality of periodic uplink transmission resources is determined based on measurements of a plurality of downlink signals.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 shows an example of a SR resource;

DETAILED DESCRIPTION

Figure 1:
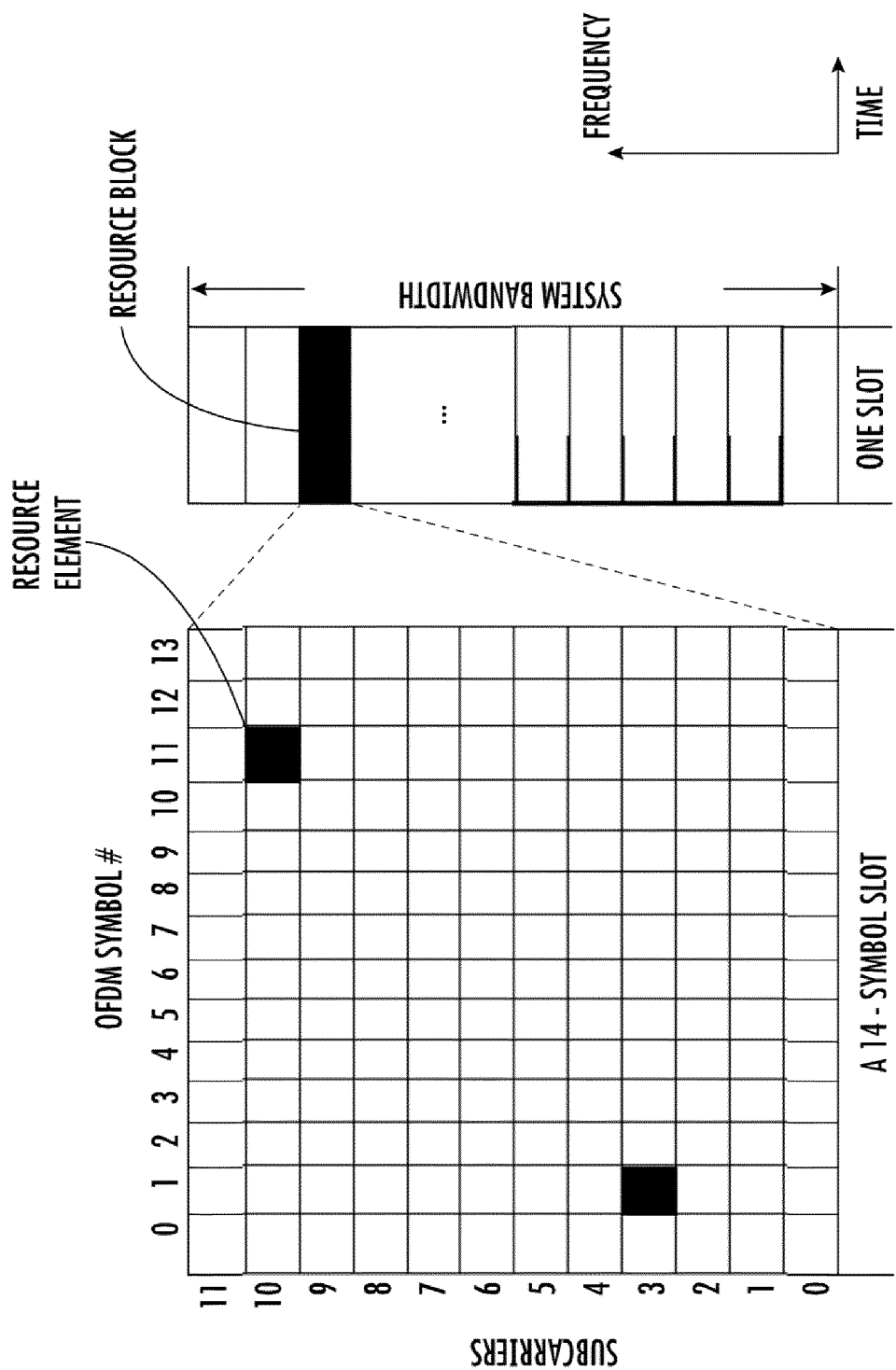
FIG. 1 is a diagram of time-frequency resources.

Before describing in detail example embodiments, it is noted that the embodiments reside primarily in combinations of apparatus components and processing steps related to adapting periodic configurations based on spatial relations. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, a periodic uplink transmission resource refers to an RRC configured PUCCH or PUSCH resource in a BWP in a serving cell that occurs periodically in time with a certain periodicity and with a time offset to a certain reference point.

Some embodiments provide for adapting periodic configurations based on spatial relations. According to one aspect, a method includes configuring multiple transmission resources or multiple sets of transmission occasions for a radio resource control configured periodic uplink transmission. The method further includes associating each configured uplink transmission received from the WD by the network node with a downlink reference signal, the downlink reference signal provided as a direct or indirect spatial relation reference for the uplink transmission.

Figure 3:
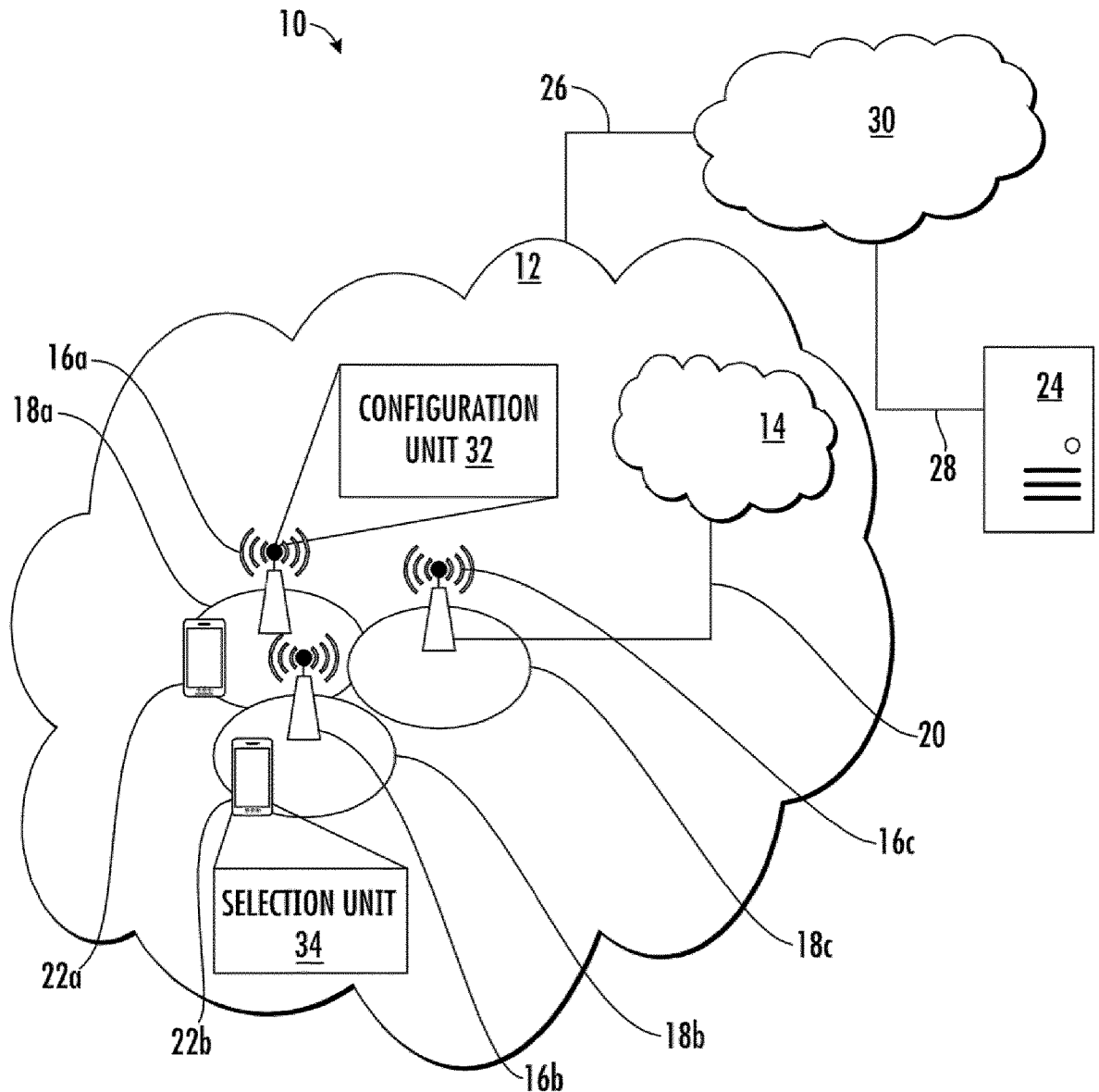
FIG. 3 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure multiple transmission resources or multiple sets of transmission occasions for a radio resource control configured periodic uplink transmission. A wireless device 22 is configured to include a selection unit 34 which is configured to select one or more configured resources, or periodicity and offset, or occasion bitmap that is associated with a downlink reference signal.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 which is configured to configure multiple transmission resources or multiple sets of transmission occasions for a radio resource control configured periodic uplink transmission.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a selection unit 34 which is configured to select one or more configured resources, or periodicity and offset, or occasion bitmap that is associated with a downlink reference signal.

Figure 4:
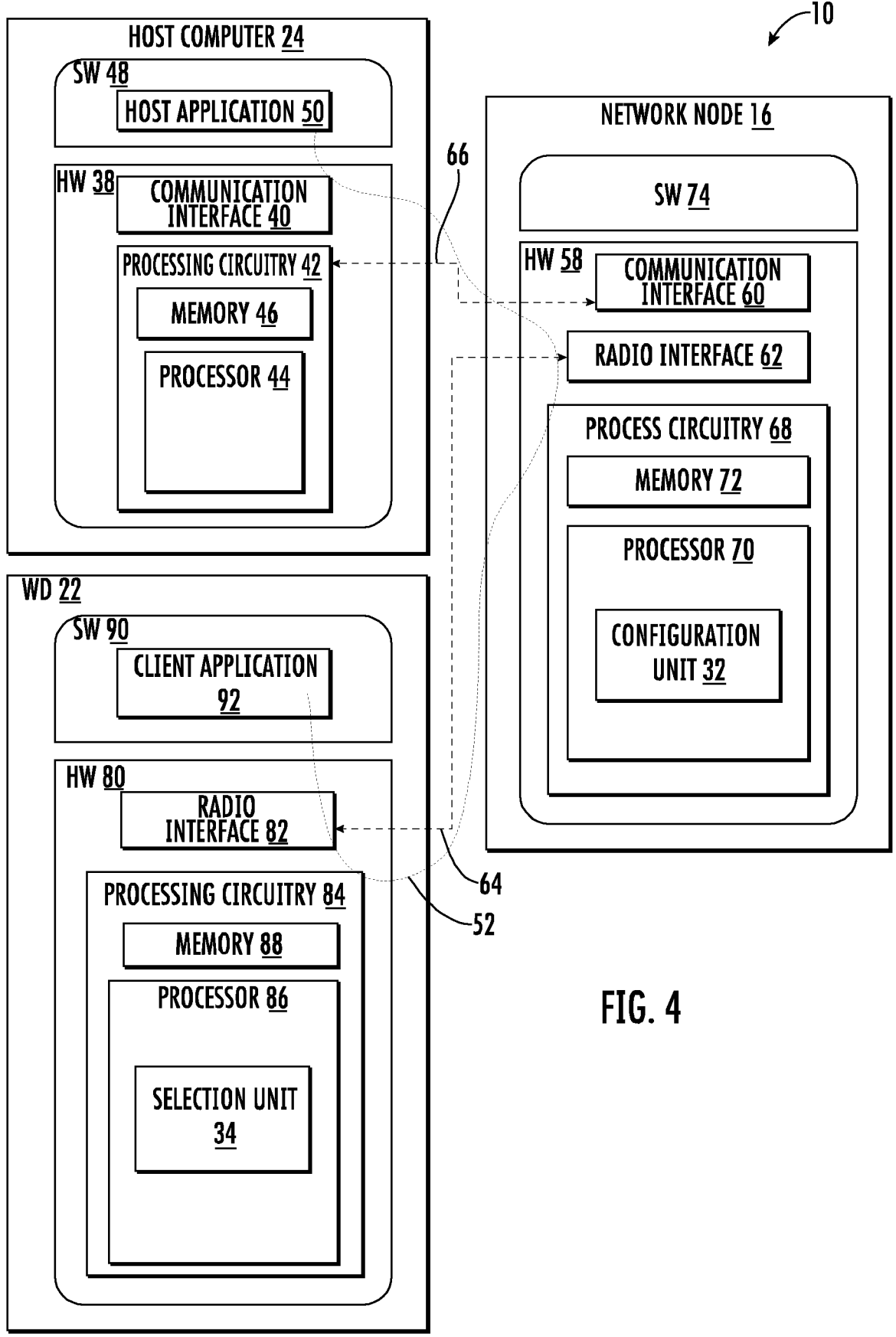
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
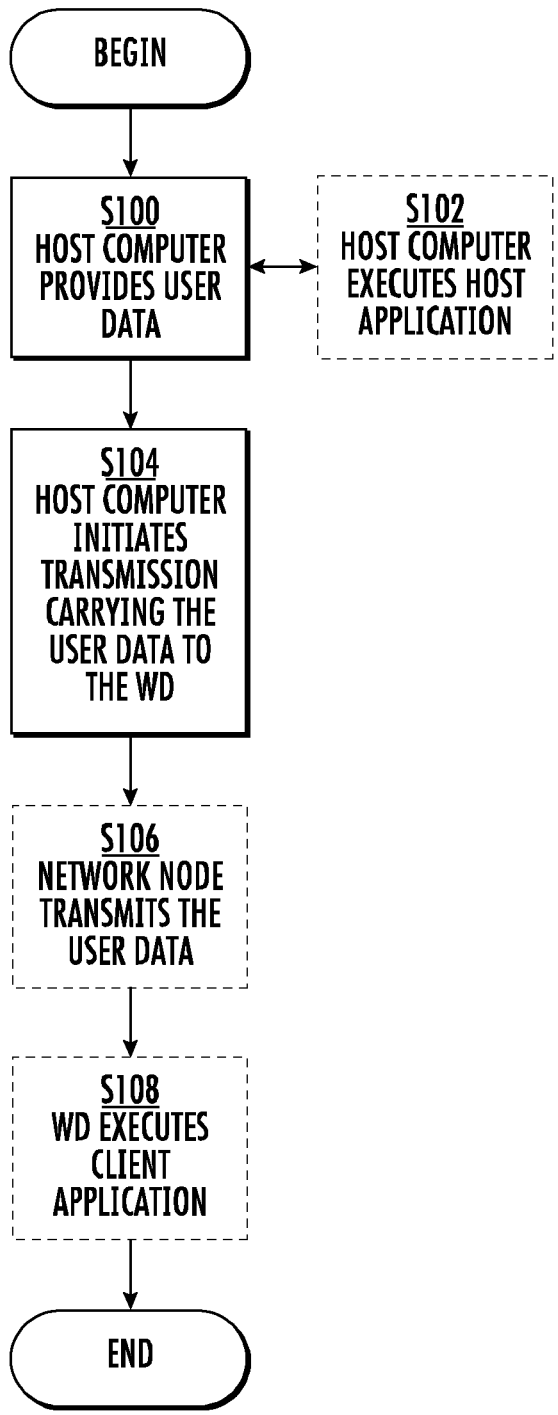
FIG. 5 is a flowchart illustrating example methods implemented in a communication system including a host computer, a network node and a wireless device for executing a client application at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 6:
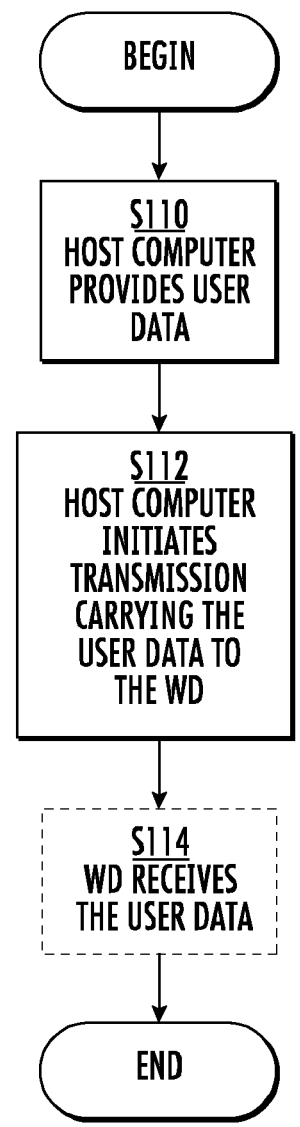
FIG. 6 is a flowchart illustrating example methods implemented in a communication system including a host computer, a network node and a wireless device for receiving user data at a wireless device according to some embodiments of the present disclosure.

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 7:
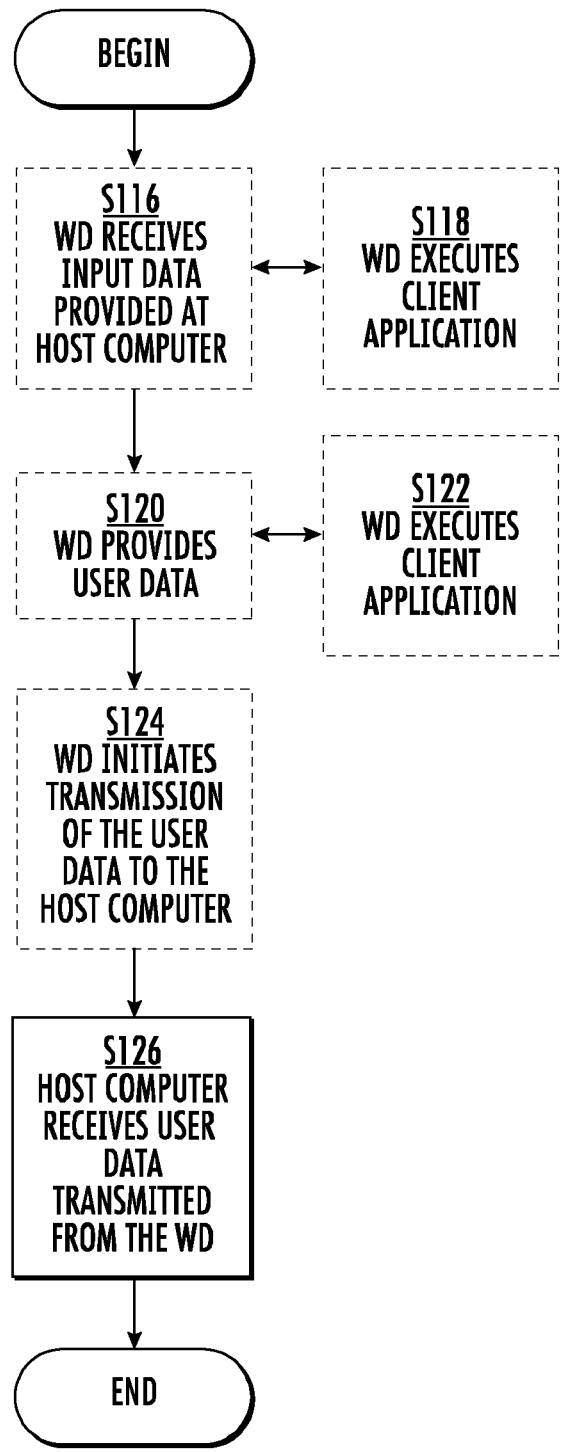
FIG. 7 is a flowchart illustrating example methods implemented in a communication system including a host computer, a network node and a wireless device for receiving user data from the wireless device at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 8:
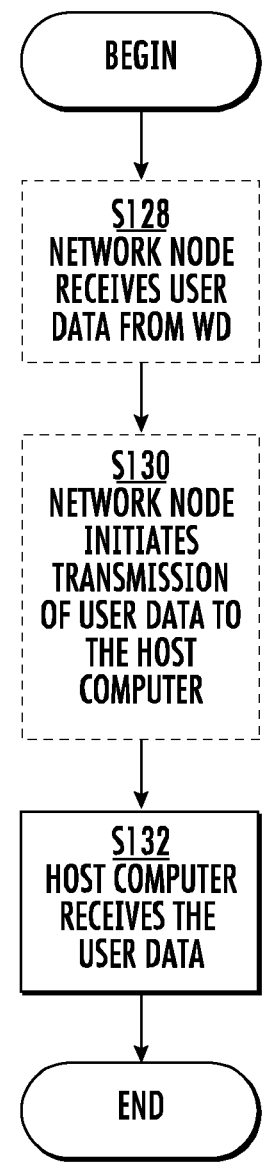
FIG. 8 is a flowchart illustrating example methods implemented in a communication system including a host computer, a network node and a wireless device for receiving user data at a host computer according to some embodiments of the present disclosure.

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
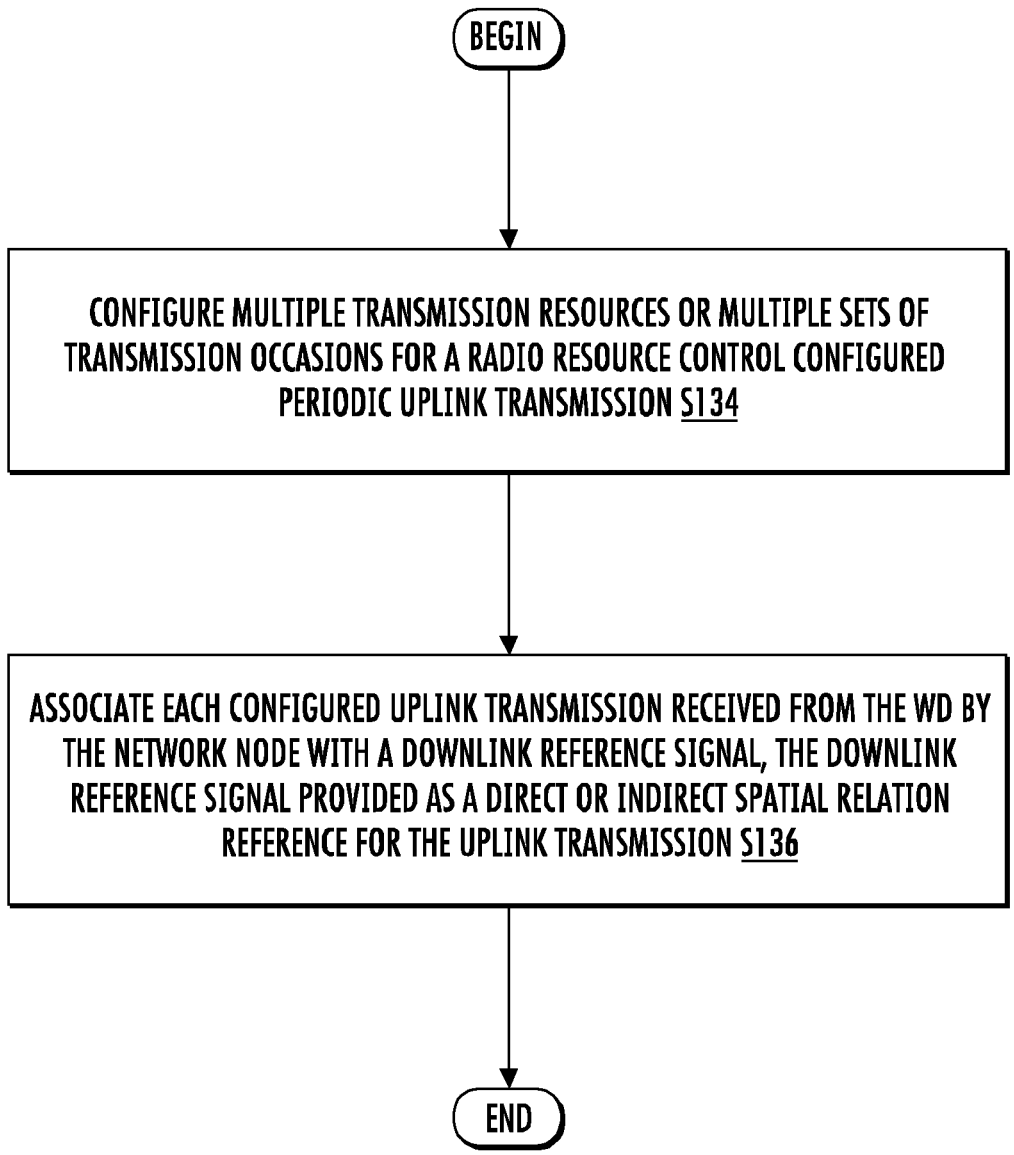
FIG. 9 is a flowchart of an example process in a network node for adapting periodic configurations based on spatial relations according to some embodiments of the present disclosure.

FIG. 9 is a flowchart of an example process in a network node 16 for adapting periodic configurations based on spatial relations. One or more blocks described herein may be performed by one or more elements of network node 16 such as by one or more of processing circuitry 68 (including the configuration unit 32), processor 70, radio interface 62 and/or communication interface 60. Network node 16 such as via processing circuitry 68 and/or processor 70 and/or radio interface 62 and/or communication interface 60 is configured to configure multiple transmission resources or multiple sets of transmission occasions for a radio resource control configured periodic uplink transmission (Block S134). The process also includes associating each configured uplink transmission received from the WD by the network node with a downlink reference signal, the downlink reference signal provided as a direct or indirect spatial relation reference for the uplink transmission (Block S136).

Figure 10:
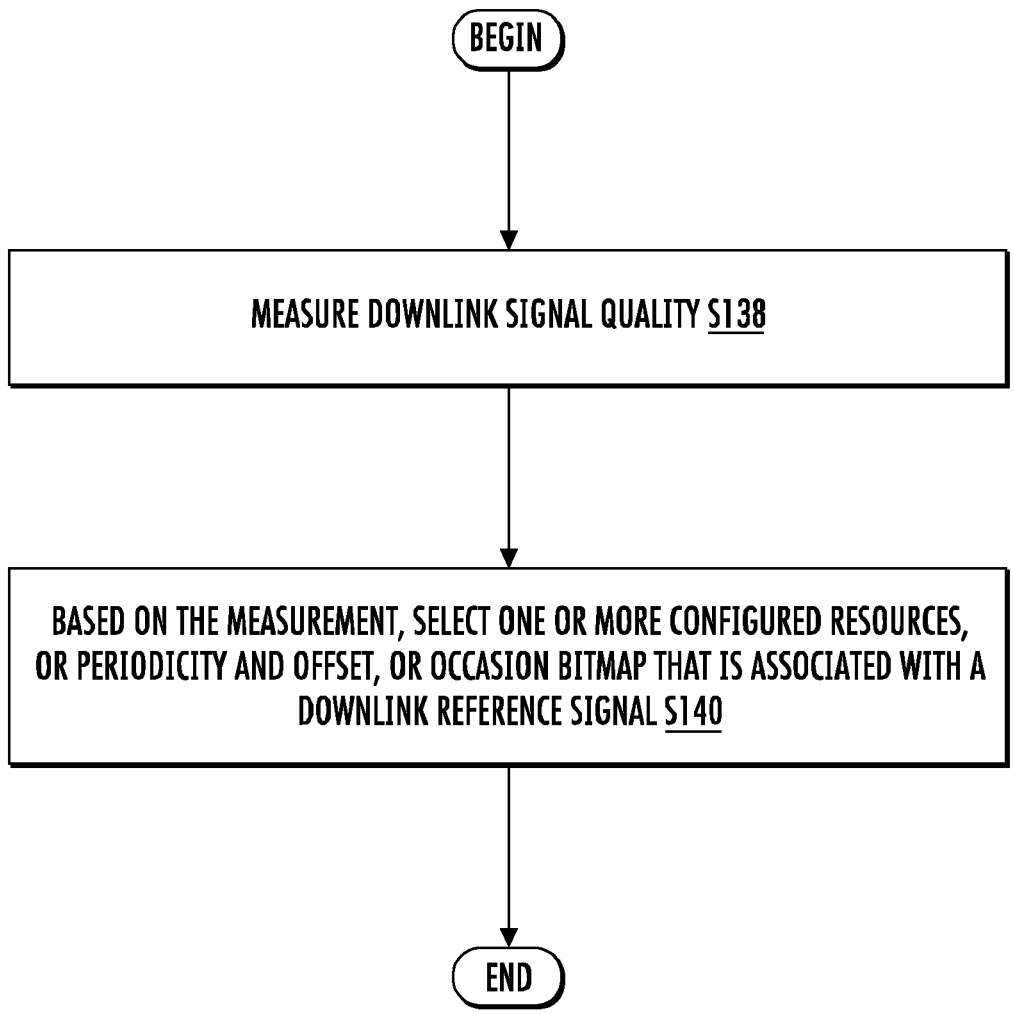
FIG. 10 is a flowchart of an example process in a wireless device for adapting periodic configurations based on spatial relations according to some embodiments of the present disclosure.

FIG. 10 is a flowchart of an example process in a wireless device 22 according to some embodiments of the present disclosure. One or more blocks described herein may be performed by one or more elements of wireless device 22 such as by one or more of processing circuitry 84 (including the selection unit 34), processor 86, radio interface 82 and/or communication interface 60. Wireless device 22 such as via processing circuitry 84 and/or processor 86 and/or radio interface 82 is configured to measure downlink signal quality (Block S138). The process also includes based on the measurement, selecting one or more configured resources, or periodicity and offset, or occasion bitmap that is associated with a downlink reference signal (Block S140).

Figure 11:
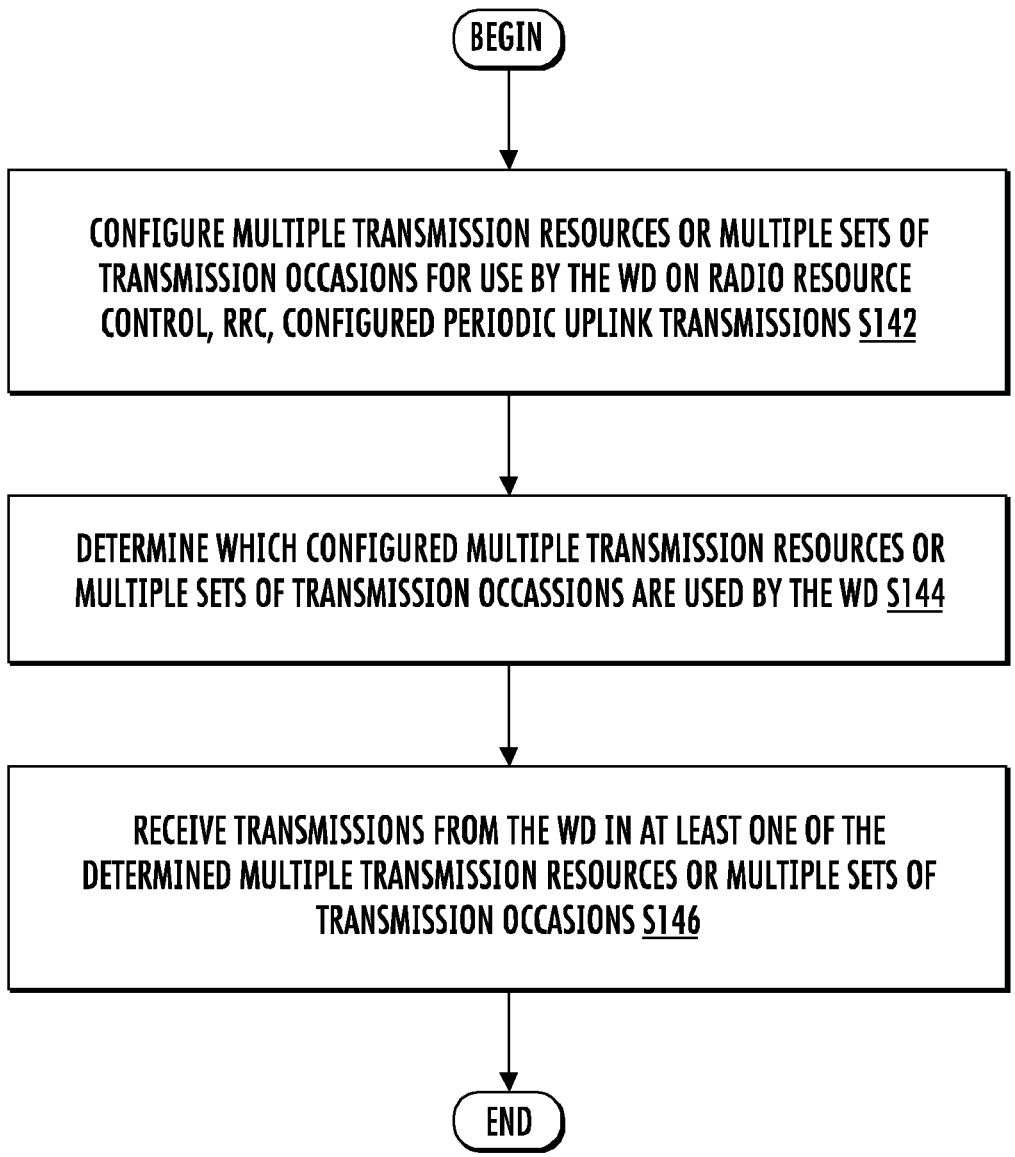
FIG. 11 is a flowchart of an example process in a network node constructed according to principles disclosed herein.

FIG. 11 is a flowchart of an example process in a network node according to principles set forth herein. One or more blocks described herein may be performed by one or more elements of network node 16 such as by one or more of processing circuitry 68 (including the configuration unit 32), processor 70, radio interface 62 and/or communication interface 60. Network node 16 such as via processing circuitry 68 and/or processor 70 and/or radio interface 62 and/or communication interface 60 is configured to configure multiple transmission resources or multiple sets of transmission occasions for use by the WD on radio resource control, RRC, configured periodic uplink transmissions (Block S142). The process also includes determining which configured transmission resources or multiple sets of transmission occasions are used by the WD (Block S144). The process further includes receiving transmissions from the WD in at least one of the determined multiple transmission resources or multiple sets of transmission occasions (Block S146).

Figure 12:
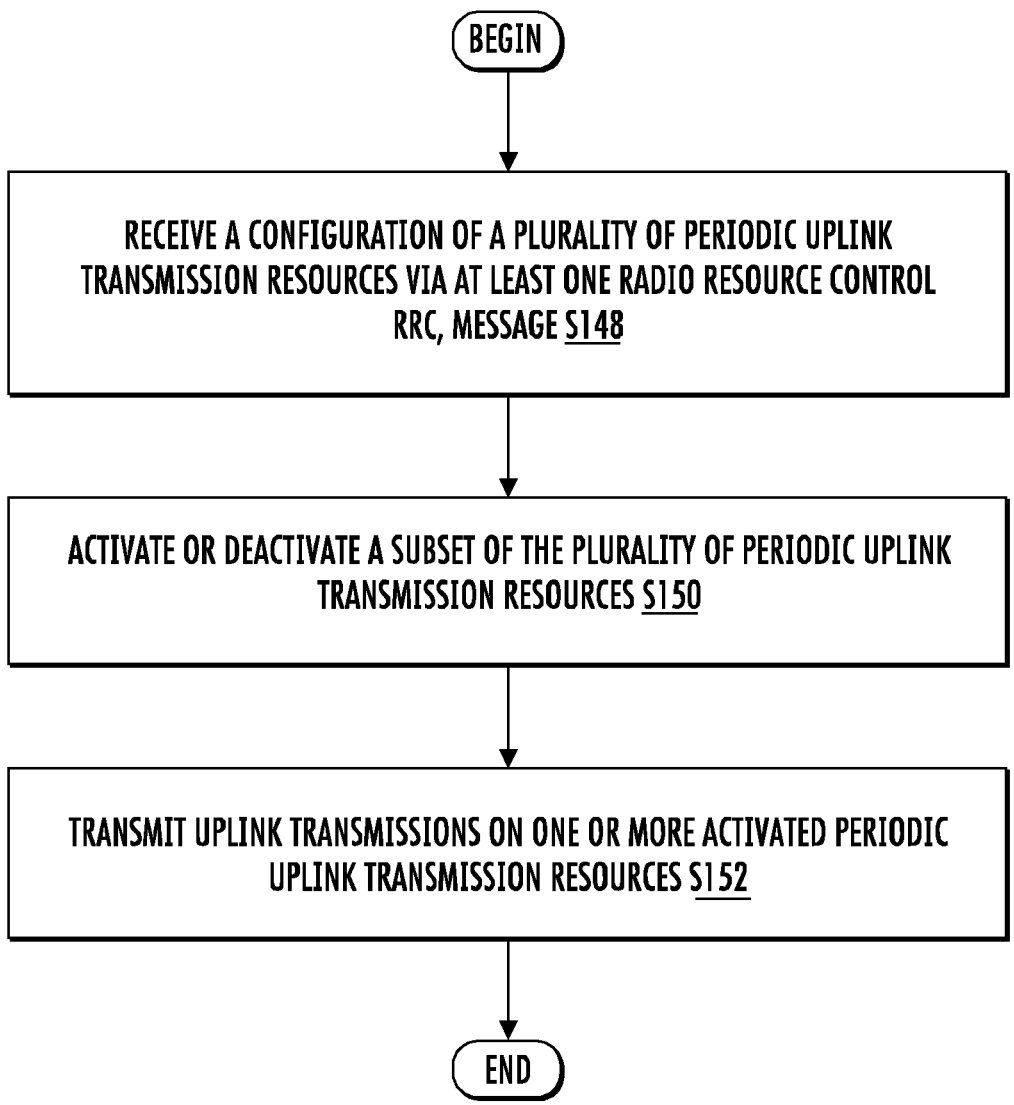
FIG. 12 is a flowchart of an example process in a wireless device constructed in accordance with principles set forth herein.
Figure 13:
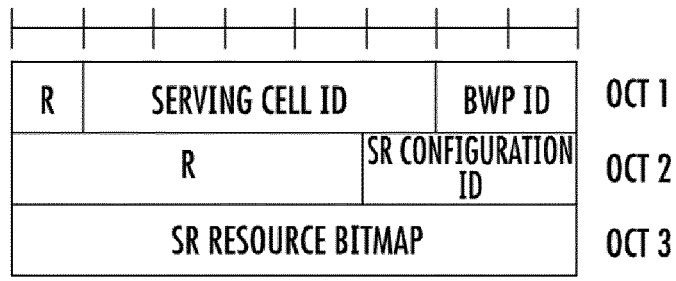
FIG. 13 is an example of a first MAC CE configuration.
Figure 14:
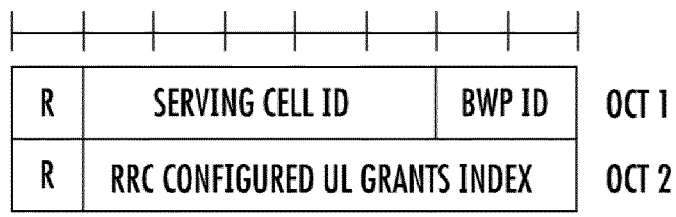
FIG. 14 is an example of a second MAC CE configuration.

FIG. 12 is a flowchart of an example process in a wireless device according to principles set forth herein. One or more blocks described herein may be performed by one or more elements of wireless device 22 such as by one or more of processing circuitry 84 (including the selection unit 34), processor 86, radio interface 82 and/or communication interface 60. Wireless device 22 such as via processing circuitry 84 and/or processor 86 and/or radio interface 82 is configured to receive a configuration of a plurality of periodic uplink transmission resources via at least one radio resource control RRC, message (Block S148). The process also includes activating or deactivating a subset of the plurality of periodic uplink transmission resources (Block S150). The process further includes transmitting uplink transmissions on one or more activated periodic uplink transmission resources (Block S152).

Having described the general process flow of arrangements of the disclosure and having provided examples of hardware and software arrangements for implementing the processes and functions of the disclosure, the sections below provide details and examples of arrangements for adapting periodic configurations based on spatial relations.

As used herein, a "valid spatial" relation is either (1) autonomously determined by the WD by measurements on the corresponding uplink or downlink reference signals, wherein the valid spatial relations correspond to measurements that are sufficiently strong, or (2) received by explicit signaling from the network. For (2), the measurements may be performed by the WD and fed back to the network previously, so the network knows what valid spatial relations to indicate to the WD.

An uplink transmission resource specifies frequency allocation, code allocation and a precoding parameter which may be needed for a WD 22 to transmit UL-SCH or UCI on the PUCCH or the PUSCH. Applicable scenarios addressed herein include Scheduling Request (SR), Configured Grant (CG) Type1 and a Periodic/Semi-Persistent (P/SP) CSI reporting configuration. When addressing a particular applicable scenario such as SR transmission, CG Type1 transmission and P/SP CSI reporting, the configuration of uplink transmission resources may take different forms as listed in the examples below.

- For SR transmission, the aforementioned periodic uplink transmission resource refers to the SchedulingRequestResourceConfig which is configured to a WD 22 as part of PUCCH-Config and used by MAC layer via the association with SchedulingRequestConfig;
- For CG Type1 transmission, the aforementioned periodic uplink transmission resource refers to rrc-ConfiguredUplinkGrant in ConfiguredGrantConfig;
- For P/SP CSI reporting, the aforementioned periodic uplink transmission resource refers to CSI-ReportConfig with reportConfigType set to periodic or semiPersistentOnPUCCH.

A periodic uplink transmission resource is associated with a periodicity and time offset, jointly referred as periodicityAndOffset. The periodicityAndOffset for a periodic uplink transmission resource specifies the periodicity and the time offset of the resource. When addressing a particular applicable scenario, the parameter may take different forms as listed in the examples below.

- For SR transmission, the parameter of periodicityAndOffset is given by SchedulingRequestResourceConfig directly;
- For CG Type1 transmission, the parameter of periodicityAndOffset is jointly provided by ConfiguredGrantConfig:periodicity and rrc-ConfiguredUplinkGrant: timeDomainOffset (with related to the system reference timing);
- For P/SP CSI reporting, the parameter of periodicityAndOffset refers to reportSlotConfig in CSI-ReportConfg.

A periodic uplink transmission resource is associated with a spatialRelationInfo parameter, which specifies the spatial relation source to be used in the transmission. When addressing a particular applicable scenario, the parameter may take different forms as listed in the examples below.

- For SR transmission, the parameter of PUCCH-SpatialRelationInfo refers to the spatial relation information of the associated PUCCH resource;
- For CG Type1 transmission, the spatial relation source is an SRS resource, and the parameter of srs-ResourceIndicator is specified in rrc-ConfiguredUplinkGrant;
- For P/SP CSI reporting, the parameter of PUCCH-spatialRelationInfo refers to the spatial relation information of the associated PUCCH resource.

Embodiment 1: Overview

This disclosure describes configuration of multiple transmission resources, or multiple sets of transmission occasions, for a RRC configured periodic uplink transmission, such as Scheduling Request, CG Type1 and P/SP CSI reporting.

In some embodiments, each configured uplink transmission resource or each set of transmission occasions is associated with one DL-RS (SSB or CSI-RS), which is provided as a direct or indirect spatial relation reference for the uplink transmission resource or the set of transmission occasions. The spatial relation can be the DL RS (SSB or CSI-RS) itself or an UL RS (SRS) which is associated with each configured uplink transmission resource or each set of transmission occasions. The association can be maintained at the network node 16 (network-controlled approach) or the WD 22 (WD autonomous approach). For the latter, the network node 16 can indicate the association to the WD 22. Ideally, all connected mode WDs 22 located in a DL-RS coverage area should initiate configured uplink transmission (i.e., uplink transmission other than dynamic scheduling) using the transmission resources or transmission occasions associated with the DL-RS. The network node 16 may configure the time domain parameters for the periodic uplink transmission resources or the transmission occasions in such a way that configured transmissions from multiple WDs 22 located in the DL-RS coverage area happen within a certain time window. Advantages of doing this are at least twofold, including: to enable configured transmissions from multiple WDs 22 to be frequency or code multiplexed in the same time resource (slot or OFDM symbols), and to facilitate network node 16 to receive the configured transmissions from multiple WDs 22 with the same network node receive beamforming filter.

At any time, or at a designated time, one or more of the configured periodic uplink transmission resources or one or more of the configured sets of transmission occasions may be selected as active resources, which can be used by WD 22 for configured uplink transmission. The determination of active configured resource(s) or set(s) of transmission occasions can be done by the network node 16 or by the WD 22. In this disclosure, the former is referred to as the network-controlled approach and the latter as the WD 22 autonomous approach. The network-controlled approach is further categorized into two different variants based on how the network node 16 communicates updates of active transmission resource(s) or active set(s) of transmission occasions to the WD 22. In some embodiments, the update of active transmission resources or set(s) of transmission occasions is explicitly signaled to the WD 22 by the network node 16. In some embodiments, the update of the active transmission resource(s) or set(s) of transmission occasions is done implicitly by network node 16 updating spatial relation source(s) for the transmission resource(s) or set(s) of transmission occasions.

The active configured uplink transmission resource(s) or set(s) of transmission occasions may be updated as the WD 22 moves within the cell coverage area. As a WD 22 moves from one SSB or CSI-RS coverage area to another, the WD 22 may switch to another transmission resource(s) or set(s) of transmission occasions for configured uplink transmission. This can be triggered either by signaling from the network node 16 in the network-controlled approach, or autonomously based on internal measurements in the WD 22 autonomous approach. By switching to another transmission resource(s) or set(s) of transmission occasions, configured uplink transmissions may be performed at different periodicity and time occasions, with different frequency and/or code resource, and using different spatial relation sources.

Embodiment 1-1: Explicit Network-Controlled Approach

This embodiment describes an abstraction for the concept of the explicit network-controlled approach.

In some embodiments, a WD 22 is configured with zero, one or multiple periodic uplink transmission resources for UL-SCH or UCI transmission in a BWP in a serving cell. This is in contrast to known methods where the WD 22 is configured with at most one periodic uplink resource in a BWP in a serving cell. An exception is Configured UL Grant, for which support of multiple configured grants were introduced in 3GPP Rel-16.

WDs 22 can continuously measure DL radio quality of the reference SSBs or CSI-RSs, such as received power (i.e., L1-reference signal received power (RSRP)), reference signal received quality (RSRQ), signal to interference plus noise ratio (SINR), received signal strength information (RSSI), channel occupancy, listen before talk (LBT)/clear channel assessment (CCA) failure statistics (such as failure counter, or failure ratio), etc. The measurement result may be reported to the network node 16 by means of CSI reporting.

At any time, or at a designated time, one or more of the configured periodic uplink transmission resources may be indicated as active by the network node 16, which can be specified by RRC, MAC or Layer 1 signaling. The configured transmission resources that are not active should not be used for configured transmissions.

As a WD 22 moves from one SSB or CSI-RS beam coverage area to another, the network node 16 may update the active transmission resource(s) for the WD 22 by RRC, MAC or Layer 1 signaling. The network node 16 may determine the active transmission resource(s) for the WD 22 based on a DL-RS measurement report from the WD 22 or based on measurement on the SRS transmitted by the WD 22.

In some embodiments, a WD 22 may be configured with a bitmap field indicating a subset of periodic transmission occasions in the time domain that may be used for configured transmission. The bitmap size should be sufficiently long to cover the number of the periodic occasions during at least one PUCCH-CSI reporting interval.

As a WD 22 moves from one SSB or CSI-RS beam coverage area to another, the network node 16 may update the bitmap for the WD 22 by RRC, MAC or Layer 1 signaling. The network node 16 may determine the bitmap for the WD 22 based on DL-RS measurement report from the WD 22 or based on measurement on SRS transmitted by the WD 22.

Embodiment 1-1a: Scheduling Request

In some embodiments, an SR configuration can be associated with one or more SR resources (SchedulingRequestResourceConfig) in a BWP in a serving cell. At any time, or at a designated time, one or multiple ones of the configured SR resources may be indicated as active, which can be specified by an explicit indicator. The active SR resource indicator can take the form of an index referring to one of the SR resources, or a bit field to support indicating multiple active SR resources, for example, SR-ActiveResourceIndex or SR-ActiveResourceBitmap respectively. As a WD 22 moves from one SSB or CSI-RS beam coverage area to another, the network node 16 may update the active SR resource(s) for the WD 22 by RRC, MAC or Layer 1 signaling.

Figure 15:
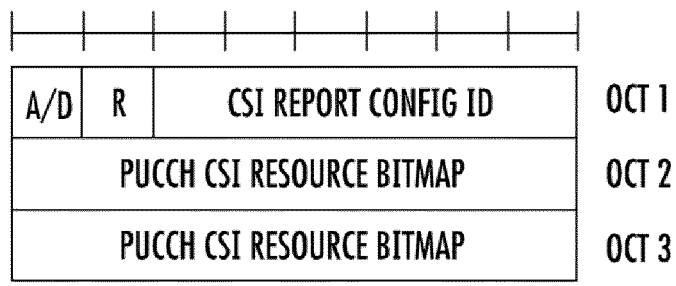
FIG. 15 is an example of a third MAC CE resource configuration.

In some embodiments, a new MAC CE is introduced to update active SR resource for a SR configuration. FIG. 15 is an example of an SR resource activation/deactivation MAC-CE, in which the SR resource bitmap specifies one or multiple active SR resources (e.g., 0/1 for activation/deactivation) for the SR configuration in the BWP in the serving cell as specified by the respective fields in the MAC CE.

In some embodiments, the network node 16 updates the active SR resource(s) with a DCI, which can be an extension of an existing DCI format or a new DCI format. The DCI format should carry a field to specify one or more of the configured SR resources for an SR configuration in a BWP in a serving cell.

Embodiment 1-1b: CG Type1

In some embodiments, a WD 22 is configured with a CG Type1 configuration (ConfiguredGrantConfig) which contains one or multiple RRC configured UL grants (rrc-ConfiguredUplinkGrant). Each of the UL grants contains an SRS resource indicator (SRS-ResourceInfo) referring to an SRS resource in the SRS configuration, which is in turn configured with spatial relation to a certain DL or UL RS (SSB, CSI-RS or another SRS). Alternatively, the WD 22 may be configured with multiple CG Type1 configurations with one RRC configured UL grant in each CG Type1 configuration, and hence, effectively configured with multiple RRC configured UL grants. At any time, or at a designated time, one or multiple of the configured UL grants may be indicated as active, which can be specified by an explicit indicator. The active grant indicator can take the form of an index referring to one of the configured UL grants, or a bit field to support indicating multiple active configured UL grants, said cg-ActiveConfiguredUplinkGrantIndex or cg-ActiveConfiguredUplinkGrantBitmap respectively.

As the WD 22 moves from one SSB or CSI-RS coverage area to another, the network node 16 may update the active configured UL grant configuration for the WD 22 by RRC, MAC or Layer 1 signaling.

In some embodiments, the network node 16 updates the active configured UL grant(s) by sending a MAC CE to the WD 22. In some embodiments, a new MAC CE format, said CG Type1 Active Grant Update MAC CE can be introduced for this purpose. The new MAC CE may contain one indicator specifying which configured UL grants are activated in a BWP in a serving cell, as exemplified in FIG. 16.

In some embodiments, the network node 16 updates the active configured UL grant via DCI, which can be an extension of an existing DCI format or a new DCI format. The DCI format should carry a field to specify that one or more of the configured UL grants in the CG configuration are activated and should be used by the WD 22 for subsequent CG Type1 transmission.

Embodiment 1-1c: P/SP CSI Reporting

In some embodiments, a persistent/semipersistent (P/SP) CSI report configuration (CSI-ReportConfig with reportConfigType set to periodic or semiPersistentOnPUCCH) can be associated with one or multiple PUCCH CSI resources (PUCCH-CSI-Resource) in a BWP in a serving cell. At any time, or at a designated time, one or multiple of the configured PUCCH CSI resources may be indicated as active, which can be specified by an explicit indicator. The active PUCCH CSI resource indicator can take the form of an index referring to one of the PUCCH CSI resources, or a bit field to support indicating multiple active PUCCH CSI resources, say csi-ActivePUCCH-CSI-ResourceIndex or csi-ActivePUCCH-CSI-ResourceBitmap respectively.

As a WD 22 moves from one SSB or CSI-RS beam coverage area to another, network node 16 may update the active PUCCH CSI resource(s) for the WD 22 by RRC, MAC or Layer 1 signaling.

In some embodiments, a new MAC CE may be used to update active PUCCH CSI resource for a P/SP CSI report configuration. FIG. 15 gives an example of a PUCCH CSI resource activation/deactivation MAC-CE, in which the A/D bit indicates PUCCH CSI resource activation/deactivation, and the PUCCH CSI resource bitmap specifies one or multiple active PUCCH CSI resources for the CSI report.

In some embodiments, the network node 16 updates the active PUCCH CSI resource(s) with a DCI, which can be an extension of an existing DCI format or a new DCI format. The DCI format should carry a field to specify one or more of the configured PUCCH CSI resources in for a P/SP CSI report configuration.

Embodiment 1-2: Implicit Network-Controlled Approach

This embodiment describes an abstraction for the concept of the implicit network-controlled approach.

In some embodiments, a WD 22 is configured with zero, one or multiple periodic uplink transmission resources for UL-SCH or UCI transmission in a BWP in a serving cell, in contrast to known methods where the WD 22 is configured with zero or one periodic uplink resource in a BWP in a serving cell. Each configured uplink transmission resource is associated with a spatial relation to a DL RS or SRS resource, effectively creating a list of (transmissionResource, spatialRelationInfo) pairs.

In some embodiments, a WD 22 may be configured with multiple sets of periodic transmission occasions for an uplink transmission resource in a BWP in a serving cell, with each set of the transmission occasions associated with a particular spatial relation source. In some embodiments, the sets of transmission occasions may be defined as a list of (periodicityAndOffset, spatialRelationInfo) pairs for an uplink transmission resource.

In some embodiments, the sets of the transmission occasions are defined as a list of (timeOffset, spatialRelationInfo) pairs where the offset either overrides the single offset configured by periodicyAndOffset for the periodic uplink transmission resource or alternatively is added (potentially modulo the periodicity) to the existing offset.

In another example, the sets of transmission occasions are defined as a list of (occasionBitmap, spatialRelationInfo) pairs for an uplink transmission resource.

WDs 22 can continuously measure DL radio quality of the reference SSBs or CSI-RSs, such as received power (i.e., L1-RSRP), RSRQ, SINR, RSSI, channel occupancy, LBT/CCA failure statistics (such as failure counter, or failure ratio), etc. The measurement result is reported to the network node 16 by means of CSI reporting as may be known.

At any time, or at a designated time, one or multiple configured transmission resources or one or multiple sets of transmission occasions may be selected by the network node 16 and communicated to the WD 22. The network node 16 may determine the active transmission resource(s) or the active set(s) of transmission occasions for the WD 22 based on DL-RS measurement report from the WD 22 or based on measurement on SRS transmitted by the WD 22.

As a WD 22 moves from one SSB or CSI-RS beam coverage area to another, the network node 16 may update the active transmission resource(s) or the active set(s) of transmission occasions for the WD 22. The network node 16 may update the active transmission resource(s) or the active set(s) of transmission occasions implicitly by reconfiguring the associated spatial relation used for PUCCH or PUSCH transmission, by which different entries in the list of (transmissionResource, spatialRelationInfo) pairs, or the list of (periodicityAndOffset, spatialRelationInfo) pairs, or the list of (timeOffset, spatialRelationInfo) pairs, or the list of (occasionBitmap, spatialRelationInfo) pairs, and hence different transmission resource(s) or different set(s) of configured transmission occasions, can be selected. The configured transmission resources or sets of transmission occasions that are not active should not be used for configured transmissions.

In some embodiments, each configured uplink transmission resource or set of resources corresponding to different transmit occasions is configured with a spatial relation to DL RS (CSI-RS or SSB) or UL RS (SRS), and as the WD 22 moves from one SSB or CSI-RS beam coverage area to another, the network node 16 updates the spatial relation to either a valid reference signal (RS) identifier (ID), or an invalid identifier. In some embodiments, the invalid identifier can be a NULL value (such as all-zeros (0) or all-ones (63), or −1). The configured resources or sets of resources with invalid identifiers may not be used for configured transmissions.

Embodiment 1-2a: Scheduling Request

In some embodiments, an SR configuration (SchedulingRequestConfig) can be associated with one or multiple SR resources (SchedulingRequestResourceConfig) in a BWP in a serving cell, effectively creating a list of (SchedulingRequestResourceConfig, PUCCH-SpatialRelationInfoId) pairs. In some embodiments, only the SR resources associated with a valid spatial relation can be used for SR transmission.

Alternatively, multiple SR configurations (SchedulingRequestConfig) can be configured for a logical channel (LCH) in a BWP in a serving cell, each associated with a PUCCH-SpatialRelationInfoId included in SchedulingRequestResourceConfig, effectively creating a list of (SchedulingRequestConfig, PUCCH-SpatialRelationInfoId) pairs. In some embodiments, only the SR resources associated with a valid spatial relation can be used for SR transmission.

In some embodiments, an SR configuration can be configured with one or multiple set of SR transmission occasions in a BWP in a serving cell, specified by periodictyAndOffset, or timeOffset, or occassionBitmap as described in Embodiment 1-2.

As a WD 22 moves from one SSB or CSI-RS beam coverage area to another, the network node 16 may update the spatial relation configuration for the PUCCH used by the SR resource(s). The active spatial relation for the PUCCH resource can be changed by MAC CE, (i.e. (Enhanced) PUCCH Spatial Relation Activation/Deactivation MAC CE). By configuring a certain spatial relation for the PUCCH(s), the corresponding SR resource(s) or set(s) of transmission occasions are implicitly indicated as active.

In some embodiments, a NULL value (such as all-zeros (0) or all-ones (63), or −1) can be introduced for the Spatial Relation Info ID field in the MAC CE to indicate that the corresponding PUCCH resource doesn't have a valid spatial relation configuration. In some embodiments, the network node 16 only indicates in the MAC CE the active PUCCH resources and their corresponding spatial relation info. The PUCCH resources whose spatial relations are not indicated by the MAC CE can be interpreted as invalid or not active.

In some embodiments, the network node 16 updates the spatial relation for SR resource via DCI, which can be an extension of an existing DCI format or a new DCI format. The DCI format should carry at least one or more PUCCH resource IDs and the corresponding Spatial Relation Info ID(s), respectively referring to PUCCH resource configuration and spatial relation info configuration in RRC.

Embodiment 1-2b: CG Type1

In some embodiments, a WD 22 is configured a CG Type1 configuration (ConfiguredGrantConfig) in one BWP in a serving cell, which contains one or multiple RRC configured UL grants (rrc-ConfiguredUplinkGrant). Each of the UL grants contains an SRS resource indicator referring (SRS-ResourceInfo) to an SRS resource in the SRS configuration, which is in turn configured with spatial relation to a certain DL or UL RS (SSB, CSI-RS or another SRS). This effectively creates a list of (rrc-ConfiguredUplinkGrant, SRS-ResourceInfo) pairs.

Alternatively, the WD 22 may be configured with multiple CG Type1 configurations with one RRC configured UL grant in each CG Type1 configuration, and hence assigned with multiple RRC configured UL grants. Each RRC configured grant may contain an SRS resource indicator, effectively creating a list of (ConfiguredGrantConfig, SRS-ResourceInfo) pairs.

In another embodiment, a CG Type1 configuration can be configured with one or multiple set of PUSCH transmission occasions in a BWP in a serving cell, specified by periodictyAndOffset, or timeOffset, or occassionBitmap as described in Embodiment 1-2.

As a WD 22 moves from one SSB or CSI-RS beam coverage area to another, the network node 16 may update the spatial relation configuration for the RRC configured grant. The active spatial relation for the RRC configured grant changed by MAC CE (e.g., by activation/deactivation of a semi-persistent SRS which in turn has a spatial relation to an SSB/CSI-RS via the SP SRS Activation/Deactivation MAC CE). By configuring a certain spatial relation for the configured grant PUSCH, the corresponding RRC configured grant(s) or set(s) of transmission occasions are implicitly indicated as active. Those configured grants for which the SP SRS is deactivated by MAC-CE are implicitly indicated as inactive and should not be used for configured transmissions. In some embodiments, the network node 16 updates the spatial relation for CG Type1 RRC configured grant via DCI, which can be an extension of an existing DCI format or a new DCI format. The DCI format should carry at least one or more RRC configured grant indices and the corresponding SRS resource indicators, respectively referring to RRC configured grant configuration and SRS resource configuration in RRC.

Embodiment 1-2c: P/SP CSI Reporting

In some embodiments, a P/SP CSI report configuration (CSI-ReportConfig with reportConfigType set to periodic or semiPersistentOnPUCCH) can be assigned with one or multiple PUCCH CSI resources (PUCCH-CSI-Resource), effectively creating a list of (PUCCH-CSI-Resource, PUCCH-SpatialRelationInfoId) pairs. Only the PUCCH CSI resources associated with a valid spatial relation can be used for CSI reporting.

In some embodiments, a P/SP CSI report configuration can be configured with one or multiple set of PUCCH transmission occasions in a BWP in a serving cell, specified by periodictyAndOffset, or timeOffset, or occassionBitmap as described in Embodiment 1-2.

As a WD 22 moves from one SSB or CSI-RS beam coverage area to another, the network node 16 may update the spatial relation configuration for the PUCCH resource referred in the P/SP CSI report configuration. The active spatial relation for the PUCCH resource can be changed by MAC CE as in the prior art (i.e. (Enhanced) PUCCH Spatial Relation Activation/Deactivation MAC CE). By configuring a certain spatial relation for the PUCCH(s), the corresponding PUCCH CSI resource(s) or set(s) of transmission occasions are implicitly indicated as active.

In some embodiments, a NULL value (such as all-zeros (0) or all-ones (63)) can be introduced for the Spatial Relation Info ID field in the MAC CE to indicate that the corresponding PUCCH resource doesn't have a valid spatial relation configuration. In another non-limiting example, the network node 16 only indicates in the MAC CE the active PUCCH resources and their corresponding spatial relation info. The PUCCH resources whose spatial relations are not indicated by the MAC CE can be interpreted as invalid or not active.

In some embodiments, the network node 16 updates the spatial relation for PUCCH CSI resource via DCI, which can be an extension of an existing DCI format or a new DCI format. The DCI format should carry at least one or more PUCCH resource IDs and the corresponding Spatial Relation Info ID(s), respectively referring to PUCCH resource configuration and spatial relation info configuration in RRC.

Embodiment 1-3: WD Autonomous Approach

This embodiment describes an abstraction for the concept of the WD 22 autonomous approach.

As described in the previous embodiments, WDs 22 configured with multiple periodic uplink transmission resources, or alternatively a list of (periodicityAndOffset, spatialRelationInfo) pairs, or a list of (timeOffset, spatialRelationInfo) pairs, or a list of (occasionBitmap, spatialRelationInfo) pairs for an uplink transmission resource, can continuously measure DL radio quality of the reference SSBs or CSI-RSs, such as received power (i.e., L1-RSRP), RSRQ, SINR, RSSI, channel occupancy, LBT/CCA failure statistics (such as failure counter, or failure ratio), etc. Based on the measurement result, the WDs 22 may choose one or more configured resources, or a periodicity and offset, or an occasion bitmap, that is associated with the preferred DL-RS for configured uplink transmission, while ignoring the configured resources associated with the SSBs or CSI-RSs with inferior received power.

The WD 22 may apply at least one of the options below to select the preferred SSBs or CSI-RSs:

As one option, at least one threshold for quantities such as received power (i.e., L1-RSRP), RSRQ, SINR, RSSI, channel occupancy, LBT/CCA failure statistics (such as failure counter, or failure ratio) etc., may be adopted by the WD 22 to select the preferred SSB or CSI-RS. In the first step, the WD 22 selects a list of candidates with measured quality above the threshold. In the second step, WD 22 may select any one from the list of candidates from the first step. Alternatively, the WD 22 may select the strongest one from the list of candidates from the first step. If there is no SSB or CSI-RS with the measured quality above the threshold, the WD 22 may select any SSB or CSI-RS. Alternatively, the WD 22 can select the SSB or CSI-RS with strongest radio quality.

As another option, the WD 22 may select the SSB or CSI-RS based on more than one measurement quantity. The WD 22 may select SSBs or CSI-RSs in case all measurement quantities have met the thresholds. Alternatively, the WD 22 may first select a set of SSBs or the CSI-RSs with strongest measurements in terms of a first measurement quantity. Second, the WD 22 may select the SSBs or the CSI-RSs with strongest measurements in terms of a second measurement quantity within the set.

In case where an SRS resource is configured as a spatial relation source for a configured uplink transmission resource, and the reference SRS is configured with direct or indirect spatial relation to a DL reference signal, i.e., SSB or CSI-RS, the spatial relation source for the SR resource can be traced down to an SSB or a CSI-RS in the end. In these cases, the WD 22 may select active configured uplink resource or periodicityAndOffset or timeOffset or occasionBitmap directly based on measurement on the SSB or CSI-RS.

In cases where an SRS resource is configured as spatial relation source for an configured uplink resource, and the reference SRS is not configured with direct or indirect spatial relation to a DL reference signal, i.e., SSB or CSI-RS, a "virtual spatial relation" between the configured uplink resource and a DL reference signal can be built and maintained by the WD 22. In some embodiments, the "virtual spatial relation" can be built and maintained internally by the WD 22 based on recent history of measurement on the DL reference signals and SRS resource indication for recent PUCCH/PUSCH transmissions In these cases, the WD 22 may select active configured uplink resource or periodicityAndOffset or timeOffset or occasionBitmap based on measurement on the SSB or CSI-RS associated via the "virtual spatial relation".

In some embodiments, another non-limiting embodiment, the "virtual spatial relation" can be explicitly indicated by the network node 16 to the WD 22 either by MAC-CE or DCI based signaling.

Figure 16:
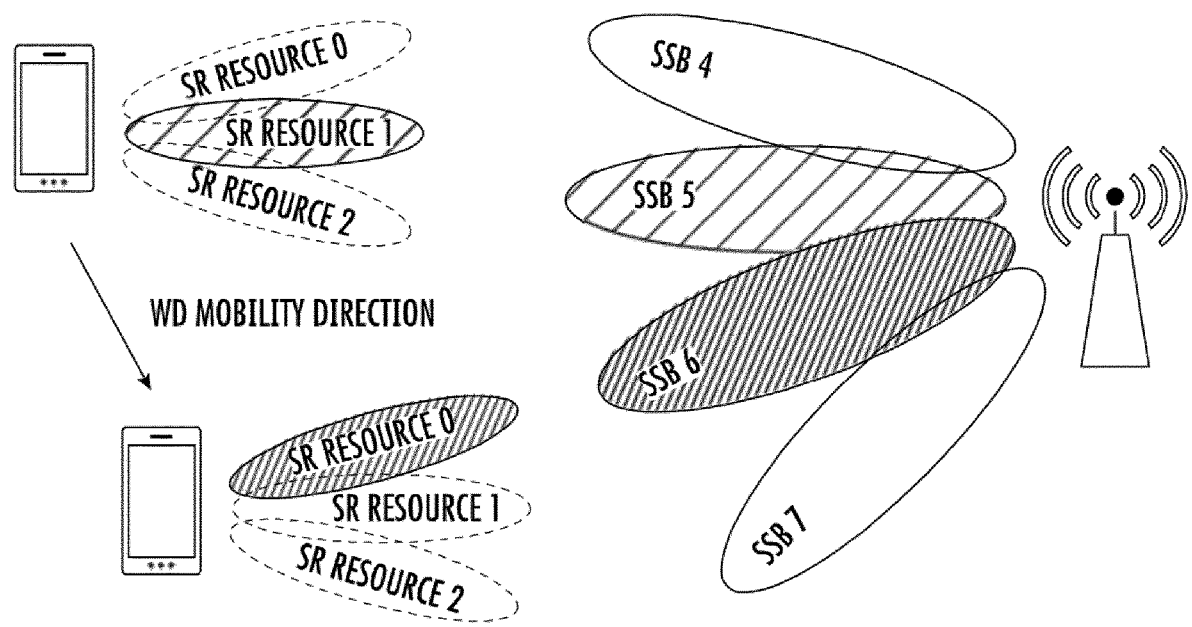
FIG. 16 illustrates WD autonomous SR resource switching.

FIG. 16 shows an example of a WD 22 autonomously switching SR resources during mobility. At the first location, the WD 22 transmits with SR resource 1, which is configured with direct or indirect spatial relation to SSB5. After the WD 22 moves to the second location, the WD 22 measures stronger received power from SSB6, and autonomously switches to SR resource 0 for subsequent SR transmission.

According to one aspect, a network node 16 configured to communicate with a wireless device (WD 22), includes a radio interface 62 and/or processing circuitry 68 configured to configure multiple transmission resources or multiple sets of transmission occasions for a radio resource control configured periodic uplink transmission, The network node 16 is further configured to associate each configured uplink transmission received from the WD 22 by the network node 16 with a downlink reference signal, the downlink reference signal provided as a direct or indirect spatial relation reference for the uplink transmission.

According to this aspect, in some embodiments, the processing circuitry 68 and/or radio interface further signals the association to the WD 22. In some embodiments, the processing circuitry 68 is further configured to configure time domain parameters for the periodic uplink transmission so as to cause all configured uplink transmission to occur within a certain time window. In some embodiments, the processing circuitry 68 is further configured to select one or more of the periodic uplink transmission resources or one or more sets of transmission occasions. In some embodiments, the processing circuitry is further configured to periodically update the spatial relation references.

According to another aspect, a method implemented in a network node 16, includes configuring, via the processing circuitry 68, multiple transmission resources or multiple sets of transmission occasions for a radio resource control configured periodic uplink transmission, and associating each configured uplink transmission received from the WD 22 by the network node 16 with a downlink reference signal, the downlink reference signal provided as a direct or indirect spatial relation reference for the uplink transmission.

According to this aspect, in some embodiments, the method further includes signaling, via the radio interface 62, the association to the WD 22. In some embodiments, the method further includes configuring, via the processing circuitry 68, time domain parameters for the periodic uplink transmission so as to cause all configured uplink transmission to occur within a certain time window. In some embodiments, the method further includes selecting, via the processing circuitry 68, one or more of the periodic uplink transmission resources or one or more sets of transmission occasions. In some embodiments, the method further includes periodically updating the spatial relation references.

According to yet another aspect, a wireless device (WD 22) is configured to communicate with a network node 16. The WD 22 includes a radio interface 82 and/or processing circuitry 84 configured to measure downlink signal quality, and based on the measurement, select one or more configured resources, or periodicity and offset, or occasion bitmap that is associated with a downlink reference signal.

According to this aspect, the selecting includes choosing a configured resource, or periodicity and offset, or occasion bitmap that results in measured signal quality that exceeds a threshold.

According to another aspect, a method implemented in a wireless device (WD 22), includes measuring, via the processing circuitry 84 and/or radio interface 82, downlink signal quality; and based on the measurement, selecting one or more configured resources, or periodicity and offset, or occasion bitmap that is associated with a downlink reference signal.

According to this aspect, the selecting includes choosing a configured resources, or periodicity and offset, or occasion bitmap that results in measured signal quality that exceeds a threshold.

According to another aspect, a network node 16 configured to communicate with a WD 22 is provided. The network node 16 includes processing circuitry 68 configured to configure multiple transmission resources or multiple sets of transmission occasions for use by the WD 22 on radio resource control, RRC, configured periodic uplink transmissions. The processing circuitry 68 is further configured to determine which configured multiple transmission resources or multiple sets of transmission occasions are used by the WD 22. The network node 16 also includes a radio interface 62 configured to receive transmissions from the WD 22 in at least one of the determined multiple transmission resources or multiple sets of transmission occasions.

According to this aspect, the processing circuitry 68 is further configured to activate or deactivate one or more of the RRC configured multiple transmission resources or multiple sets of transmission occasions by using explicit signaling. In some embodiments, the explicit signaling is a medium access control, MAC, control element, CE, or downlink control information, DCI. In some embodiments, transmissions received from the WD 22 are associated with a downlink reference signal, the downlink reference signal being a direct or indirect spatial relation reference for the received RRC configured periodic uplink transmissions. In some embodiments, the radio interface 62 is further configured to receive the RRC configured periodic uplink transmissions from multiple WDs 22 using a same beam forming filter. In some embodiments, the processing circuitry 68 is further configured to configure time domain parameters for the RRC configured periodic uplink transmissions by the radio interface so as to cause all RRC configured periodic uplink transmissions of a set of WDs 22 within a coverage area of a same beam to occur within a same time window. In some embodiments, a spatial relation reference for the RRC configured periodic uplink transmissions is an uplink or downlink reference signal associated with each configured uplink transmission resource of the multiple transmission resources or each set of the multiple sets of transmission occasions. In some embodiments, the processing circuitry 68 is further configured to configure the WD 22 with multiple periodic uplink transmission resources for uplink transmission in a bandwidth part in a serving cell. In some embodiments, the processing circuitry 68 is further configured to associate a scheduling request configuration with one or more scheduling request resources in a bandwidth part in a serving cell. In some embodiments, the processing circuitry 68 is further configured to configure multiple PUCCH resources for a channel state information, CSI, reporting configuration in a bandwidth part in a serving cell.

According to yet another aspect, a method in a network node 16 configured to communicate with a WD 22 is provided. The method includes configuring multiple transmission resources or multiple sets of transmission occasions for use by the WD 22 on radio resource control, RRC, configured periodic uplink transmissions. The method also includes determining which configured transmission resources or multiple sets of transmission occasions are used by the WD 22. The method further includes receiving transmissions from the WD 22 in at least one of the determined multiple transmission resources or multiple sets of transmission occasions.

According to this aspect, in some embodiments, the method further includes activating or deactivating one or more of the RRC configured multiple transmission resources or multiple sets of transmission occasions by using explicit signaling. In some embodiments, the explicit signaling is a medium access control, MAC, control element, CE, or downlink control information, DCI. In some embodiments, the transmissions received from the WD 22 are associated with a downlink reference signal, the downlink reference signal being a direct or indirect spatial relation reference for the received RRC configured periodic uplink transmissions. In some embodiments, the method includes receiving the RRC configured periodic uplink transmissions from multiple WDs 22 using a same beam forming filter. In some embodiments, the method also includes configuring time domain parameters for the RRC configured periodic uplink transmissions so as to cause all RRC configured periodic uplink transmissions of a set of WDs 22 within a coverage area of a same beam to occur within a same time window. In some embodiments, a spatial relation reference for the RRC configured periodic uplink transmissions is an uplink or downlink reference signal associated with each configured uplink transmission resource of the multiple transmission resources or each set of the multiple sets of transmission occasions. In some embodiments, the method further includes configuring the WD 22 with multiple periodic uplink transmission resources for uplink transmission in a bandwidth part in a serving cell. In some embodiments, the method also includes associating a scheduling request configuration with one or more scheduling request resources in a bandwidth part in a serving cell. In some embodiments, the method also includes configuring multiple PUCCH resources for a channel state information, CSI, reporting configuration in a bandwidth part in a serving cell.

According to another aspect, a WD 22 configured to communicate with a network node 16 is provided. The wireless device includes a radio interface 82 configured to receive a configuration of a plurality of periodic uplink transmission resources via at least one radio resource control RRC, message. The WD 22 also includes processing circuitry 84 configured to activate or deactivate a subset of the plurality of periodic uplink transmission resources. The radio interface 82 is configured to transmit uplink transmissions on one or more activated periodic uplink transmission resources.

According to this aspect, in some embodiments, the subset of the plurality of periodic uplink transmission resources are selected to be activated or deactivated based at least in part on a signal received from the network node 16. In some embodiments, the signal includes a medium access control, MAC, control element, CE, a downlink control information, DCI message, or an RRC message. In some embodiments, the activated subset of the plurality of periodic uplink transmission resources are selected autonomously by the WD 22. In some embodiments, the radio interface 82 is further configured to: receive a first message associating a spatial relation between each of the plurality of periodic uplink transmission resources and a downlink or uplink reference signal, and transmit a second message on one or more activated periodic UL transmission resources includes transmitting on UL transmission resources that are each associated with a valid spatial relation. In some embodiments, the downlink or uplink reference signal is a synchronization signal/physical broadcast channel, SS/PBCH, a channel state information reference signal, CSI-RS resource, or a sounding reference signal, SRS, resource. In some embodiments, deactivation based on a signal received from a network node includes receiving an indicator of an invalid spatial relation. In some embodiments, the processing circuitry 84 is further configured to determine the subset of the plurality of periodic uplink transmission resources based at least in part on measurements of a plurality of downlink signals. In some embodiments, the processing circuitry 84 is further configured to determine a signal quality measure of a downlink reference signal, the downlink reference signal being a direct or indirect spatial relation reference for a radio resource control, RRC, configured periodic uplink transmission. In some embodiments, the radio interface 82 is further configured to receive an RRC message indicating zero, one or multiple periodic uplink transmission resources for a shared channel transmission or uplink control information, UCI, transmission in a bandwidth part in a serving cell that includes the WD 22. In some embodiments, the processing circuitry 84 is further configured to activate or deactivate the subset of the plurality of periodic uplink transmission resources according to a bitmap, each bit of the bitmap indicating activation or deactivation of a different one of the periodic uplink transmission resources. In some embodiments, a periodic uplink transmission resource of the plurality of periodic uplink transmission resources is a scheduling request resource, a configured grant resource, or a physical uplink control channel resource for channel state information, CSI, reporting. In some embodiments, the subset of the plurality of periodic uplink transmission resources is determined based at least in part on measurements of a plurality of downlink signals.

According to yet another aspect, a method in a wireless device, WD 22, configured to communicate with a network node 16 is provided. The method includes receiving a configuration of a plurality of periodic uplink transmission resources via at least one radio resource control RRC, message. The method also includes activating or deactivating a subset of the plurality of periodic uplink transmission resources. The method also includes transmitting uplink transmissions on one or more activated periodic uplink transmission resources. In some embodiments, the subset of the plurality of periodic uplink transmission resources are selected to be activated or deactivated based at least in part on a signal received from the network node 16. In some embodiments, the signal includes a medium access control, MAC, control element, CE, a downlink control information, DCI message, or an RRC message. In some embodiments, the activated subset of the plurality of periodic uplink transmission resources are selected autonomously by the WD 22. In some embodiments, the method further includes receiving a first message associating a spatial relation between each of the plurality of periodic uplink transmission resources and a downlink or uplink reference signal, and transmitting a second message on one or more activated periodic UL transmission resources includes transmitting on UL transmission resources that are each associated with a valid spatial relation. In some embodiments, the downlink or uplink reference signal is a synchronization signal/physical broadcast channel, SS/PBCH, a channel state information reference signal, CSI-RS resource, or a sounding reference signal, SRS, resource. In some embodiments, deactivation based on a signal received from a network node includes receiving an indicator of an invalid spatial relation. In some embodiments, the method also includes determining the subset of the plurality of periodic uplink transmission resources based at least in part on measurements of a plurality of downlink signals. In some embodiments, the method also includes determining a signal quality measure of a downlink reference signal, the downlink reference signal being a direct or indirect spatial relation reference for a radio resource control, RRC, configured periodic uplink transmission. In some embodiments, the method also includes receiving an RRC message indicating zero, one or multiple periodic uplink transmission resources for a shared channel transmission or uplink control information, UCI, transmission in a bandwidth part in a serving cell that includes the WD 22. In some embodiments, the method also includes activating or deactivating the subset of the plurality of periodic uplink transmission resources according to a bitmap, each bit of the bitmap indicating activation or deactivation of a different one of the periodic uplink transmission resources. In some embodiments, a periodic uplink transmission resource of the plurality of periodic uplink transmission resources is a scheduling request resource, a configured grant resource, or a physical uplink control channel resource for channel state information, CSI, reporting. In some embodiments, the subset of the plurality of periodic uplink transmission resources is determined based at least in part on measurements of a plurality of downlink signals.

Some embodiments include the following:

Embodiment A1. A network node configured to communicate with a wireless device (WD), the network node configured to, and/or comprising a radio interface and/or comprising processing circuitry configured to:

configure multiple transmission resources or multiple sets of transmission occasions for a radio resource control configured periodic uplink transmission; and associate each configured uplink transmission received from the WD by the network node with a downlink reference signal, the downlink reference signal provided as a direct or indirect spatial relation reference for the uplink transmission.

Embodiment A2. The network node of Embodiment A1, wherein the network node and/or the processing circuitry and/or radio interface is configured to further signal the association to the WD.

Embodiment A3. The network node of any of Embodiments A1 and A2, wherein the network node and/or the processing circuitry and/or radio interface is configured further configured to configure time domain parameters for the periodic uplink transmission so as to cause all configured uplink transmission to occur within a certain time window.

Embodiment A4. The network node of any of Embodiments A1-A3, wherein the network node and/or the processing circuitry and/or radio interface is configured further configured to select one or more of the periodic uplink transmission resources or one or more sets of transmission occasions.

Embodiment A5. The network node of any of Embodiments A1-A4, wherein the network node and/or the processing circuitry and/or radio interface is configured further configured to periodically update the spatial relation references.

Embodiment B1. A method implemented in a network node, the method comprising:

configuring multiple transmission resources or multiple sets of transmission occasions for a radio resource control configured periodic uplink transmission; and associating each configured periodic uplink transmission received from the WD by the network node with a downlink reference signal, the downlink reference signal provided as a direct or indirect spatial relation reference for the uplink transmission.

Embodiment B2. The method of Embodiment B1, further comprising signaling the association to the WD.

Embodiment B3. The method of any of Embodiments B1 and B2, further comprising configuring time domain parameters for the periodic uplink transmission so as to cause all configured uplink transmission to occur within a certain time window.

Embodiment B4. The method of any of Embodiments B1-B3, further comprising selecting one or more of the periodic uplink transmission resources or one or more sets of transmission occasions.

Embodiment B5. The method of any of Embodiments B1-B4, further comprising periodically updating the spatial relation references.

Embodiment C1. A wireless device (WD) configured to communicate with a network node, the WD configured to, and/or comprising a radio interface and/or processing circuitry configured to:

measure downlink signal quality; and based on the measurement, select one or more configured resources, or periodicity and offset, or occasion bitmap that is associated with a downlink reference signal.

Embodiment C2. The WD of Embodiment C1, wherein the selecting includes choosing a configured resource, or periodicity and offset, or occasion bitmap that results in measured signal quality that exceeds a threshold.

Embodiment D1. A method implemented in a wireless device (WD), the method comprising:
  measuring downlink signal quality; and
  based on the measurement, selecting one or more configured resources, or periodicity and offset, or occasion bitmap that is associated with a downlink reference signal.

Embodiment D2. The method of Embodiment D1, wherein the selecting includes choosing a configured resource, or periodicity and offset, or occasion bitmap that results in measured signal quality that exceeds a threshold.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
  CG Configured Grant
  CSI Channel Status Information
  DCI Downlink Control Information
  FDM Frequency Division Multiplexing
  LTE Long Term Evolution
  NR New Radio
  OFDM Orthogonal Frequency Division Multiplexing
  OS OFDM Symbol
  PA Power Amplifier
  PDCCH Physical Downlink Control Channel
  PDSCH Physical Downlink Shared Channel
  PRB Physical Resource Block
  PUCCH Physical Uplink Control Channel
  PUSCH Physical Uplink Shared Channel
  RAN Radio Access Network
  RB Resource Block
  SCS Sub-Carrier Spacing
  SSB Synchronous Signal and PBCH
  SR Scheduling Request It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node comprising:
  a radio interface configured for communicating with wireless devices (WDs) operating in a cell associated with the network node, the cell divided into multiple beam coverage areas, with each beam coverage area being associated with a corresponding downlink reference signal that serves as a spatial reference for the beam coverage area;

processing circuitry configured to:
associate different uplink transmission resources with different ones of the multiple beam coverage areas, for use by the WDs in performing radio resource control (RRC) configured periodic uplink transmissions; and transmit, via the radio interface, signaling for reception by the WDs, indicating the associations; and for each WD, treating the uplink transmission resources corresponding to the beam coverage area with which the WD is currently spatially associated as being active for the WD.

2. The network node of claim 1, wherein the processing circuitry is further configured to send, via the radio interface, explicit signaling that indicates to respective ones of the WDs which uplink transmission resources are active for use by the respective WDs, based on determining current beam coverage area associations of the respective WDs.

3. The network node of claim 2, wherein the processing circuitry is configured to determine the current beam coverage area association of any particular WD among the WDs served by the network node, based on receiving feedback indicating a strongest one among a plurality of downlink reference signals, as measured by the particular WD, each downlink reference signal being spatially related to a respective one among the multiple beam coverage areas.

4. The network node of claim 1, wherein the processing circuitry is configured to determine the current beam coverage area association of any particular WD among the WDs served by the network node, based on measuring an uplink reference signal transmitted by the particular WD, using reception beamforming corresponding to each one among some or all of the beam coverage areas.

5. A method in a network node, the method comprising:
associating different uplink transmission resources with different ones among multiple beam coverage areas, for use by wireless devices (WDs) operating in a cell served by the network node in performing radio resource control (RRC) configured periodic uplink transmissions, the cell being divided into the multiple beam coverage areas; and transmit signaling for reception by the WDs, indicating the associations; and for each WD, treat the uplink transmission resources corresponding to the beam coverage area with which the WD is currently spatially associated as being active for the WD.

6. A wireless device (WD) comprising:
a radio interface configured for communicating with a network node that serves a cell of a wireless network; and processing circuitry configured to:
receive, via the radio interface, signaling that indicates associations between different uplink transmission resources and different beam coverage areas of the cell, wherein the cell is divided into multiple beam coverage areas; and perform radio resource control (RRC) configured periodic uplink transmissions using the uplink transmission resources associated with the beam coverage area with which the WD is currently spatially associated.

7. The WD of claim 6, wherein the processing circuitry is configured to determine which beam coverage area the WD is currently spatially associated with based on:
the WD making measurements on each one among multiple downlink reference signals, each downlink reference signal spatially related to a respective one among the multiple beam coverage areas of the cell;
reporting the downlink reference signal measurements to the network node; and
receiving a return indication from the network node, indicating the current beam coverage area association of the WD.

8. The WD of claim 7, wherein the return indication is received as a medium access control (MAC) control element (CE), a downlink control information (DCI) message, or an RRC message.

9. The WD of claim 6, wherein the processing circuitry is configured to determine which beam coverage area the WD is currently spatially associated with on an autonomous basis, based on using the radio interface to measure downlink reference signals, each being spatially associated with a respective one among the multiple beam coverage areas of the cell, and determining which measured downlink reference signal is the strongest at the WD.

10. The WD of claim 9, wherein the downlink reference signal for each beam coverage area is a synchronization signal/physical broadcast channel (SS/PBCH), or a channel state information reference signal (CSI-RS) resource.

11. The WD of claim 5, wherein, as the WD moves among the multiple beam coverage areas of the cell, the WD selectively activates the uplink transmission resources associated with the beam coverage area with which the WD is currently spatially associated, and deactivates the uplink transmission resources associated with the other ones of the multiple beam coverage areas.

12. A method in a wireless device (WD), the method comprising:
receiving signaling that indicates associations between different uplink transmission resources and different beam coverage areas of a cell of a wireless network which currently serves the WD, wherein the cell is divided into multiple beam coverage areas; and
performing radio resource control (RRC) configured periodic uplink transmissions using the uplink transmission resources associated with the beam coverage area with which the WD is currently spatially associated.

* * * * *